United States Patent
Nagasaka et al.

(10) Patent No.: US 9,950,503 B2
(45) Date of Patent: Apr. 24, 2018

(54) JIG FOR FIXING LAMINATED MATERIALS, A SYSTEM FOR MANUFACTURING BONDED LAMINATED MATERIALS, AND A METHOD FOR MANUFACTURING BONDED LAMINATED MATERIALS

(75) Inventors: Masahiko Nagasaka, Shinshiro (JP); Shogo Nakajima, Shinshiro (JP); Takayuki Nozawa, Shinshiro (JP); Osamu Sugino, Shinshiro (JP); Ikuto Mishima, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 519 days.

(21) Appl. No.: 13/981,759

(22) PCT Filed: Jan. 5, 2012

(86) PCT No.: PCT/JP2012/050071
§ 371 (c)(1),
(2), (4) Date: Jul. 25, 2013

(87) PCT Pub. No.: WO2012/046886
PCT Pub. Date: Apr. 12, 2012

(65) Prior Publication Data
US 2013/0306237 A1    Nov. 21, 2013

(30) Foreign Application Priority Data

Jan. 27, 2011 (JP) .................................. 2011-014646
Jun. 10, 2011 (JP) .................................. 2011-129704
Oct. 14, 2011 (JP) .................................. 2011-226776

(51) Int. Cl.
B32B 37/00    (2006.01)
B30B 3/04    (2006.01)
(Continued)

(52) U.S. Cl.
CPC ............ *B32B 37/0046* (2013.01); *B30B 3/04* (2013.01); *B30B 15/34* (2013.01); *B32B 37/10* (2013.01);
(Continued)

(58) Field of Classification Search
CPC .............. B32B 2309/68; B32B 37/003; B32B 37/0046; B32B 37/10; B32B 37/1018
See application file for complete search history.

(56) References Cited

U.S. PATENT DOCUMENTS 4,608,220 A * 8/1986 Caldwell ................ A43B 17/14
264/258
5,643,522 A * 7/1997 Park ........................ B29C 43/12
122/7 R
(Continued)

FOREIGN PATENT DOCUMENTS

JP    04-043005    2/1992
JP    08-336932    12/1996
(Continued)

OTHER PUBLICATIONS

Machine Translation of JP2008146833.*
(Continued)

*Primary Examiner* — Christopher T Schatz
(74) *Attorney, Agent, or Firm* — Finnegan, Henderson, Farabow, Garrettt & Dunner, LLP

(57) ABSTRACT

A jig for fixing laminated materials, a system for manufacturing bonded laminated materials, and a method of manufacturing bonded laminated materials are provided at a good yield factor and to efficiently manufacture the bonded laminated materials that are pressed and bonded after being laminated without a misalignment of the membranes or deformation of the laminated materials or any deficiency in bonding at the interface. The bonded laminated materials are (Continued)

manufactured by storing materials made of membranes (W) in a housing space (S) formed by a first sheet-shaped member (12), a second sheet-shaped member (22), and a sealing member (30), exhausting the housing space (S) to sandwich the laminated materials (W) between the first and second sheet-shaped members (12, 22) to fix them, and pressing and bonding them by hot-pressing rollers (51) and cold-pressing rollers (52) of a machine (50) for manufacturing the bonded laminated materials while they are fixed.

16 Claims, 21 Drawing Sheets

(51) Int. Cl.
   *B30B 15/34* (2006.01)
   *B32B 37/10* (2006.01)
   *H01M 8/0271* (2016.01)
   *H01M 8/1004* (2016.01)
   *B32B 38/18* (2006.01)

(52) U.S. Cl.
   CPC ....... *B32B 38/1833* (2013.01); *H01M 8/0271* (2013.01); *H01M 8/1004* (2013.01); *B32B 37/003* (2013.01); *B32B 2309/68* (2013.01); *B32B 2457/18* (2013.01); *Y02P 70/56* (2015.11)

(56) References Cited

U.S. PATENT DOCUMENTS

| | | | |
|---|---|---|---|
| 2004/0060652 A1* | 4/2004 | McNeely | B32B 37/1284 156/285 |
| 2005/0006492 A1 | 1/2005 | Kano et al. | |
| 2008/0020261 A1 | 1/2008 | Hendricks et al. | |
| 2008/0211130 A1* | 9/2008 | Rydin | B29C 41/08 264/102 |
| 2008/0314497 A1* | 12/2008 | Pettersen | B29C 70/44 156/62.2 |

FOREIGN PATENT DOCUMENTS

| | | |
|---|---|---|
| JP | 2004-249639 | 9/2004 |
| JP | 2005-019275 | 1/2005 |
| JP | 2005-103753 | 4/2005 |
| JP | 2008-146833 | 6/2008 |
| JP | 2008-159377 | 7/2008 |
| JP | 2010-198948 | 9/2010 |
| WO | WO 2008/108898 A2 | 9/2008 |

OTHER PUBLICATIONS

English-language International Search Report from the Japanese Patent Office for International Application No. PCT/JP2012/050071, dated Mar. 19, 2012.
Extended European Search Report for EP Application No. 12711741.4 dated May 22, 2014.

* cited by examiner

Fig. 1
(A)
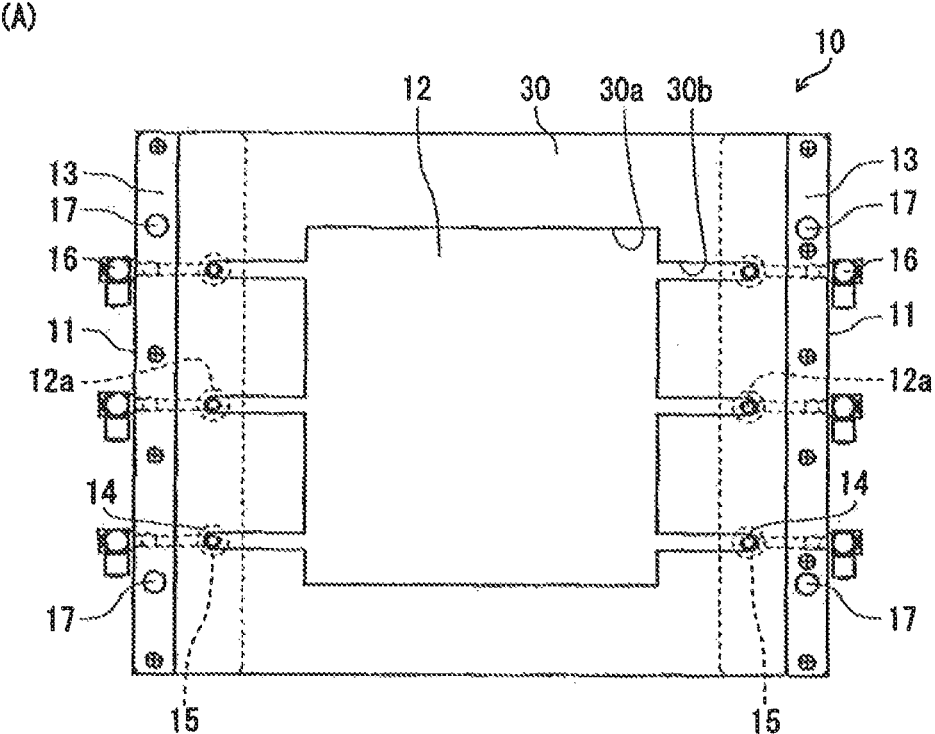
(B)
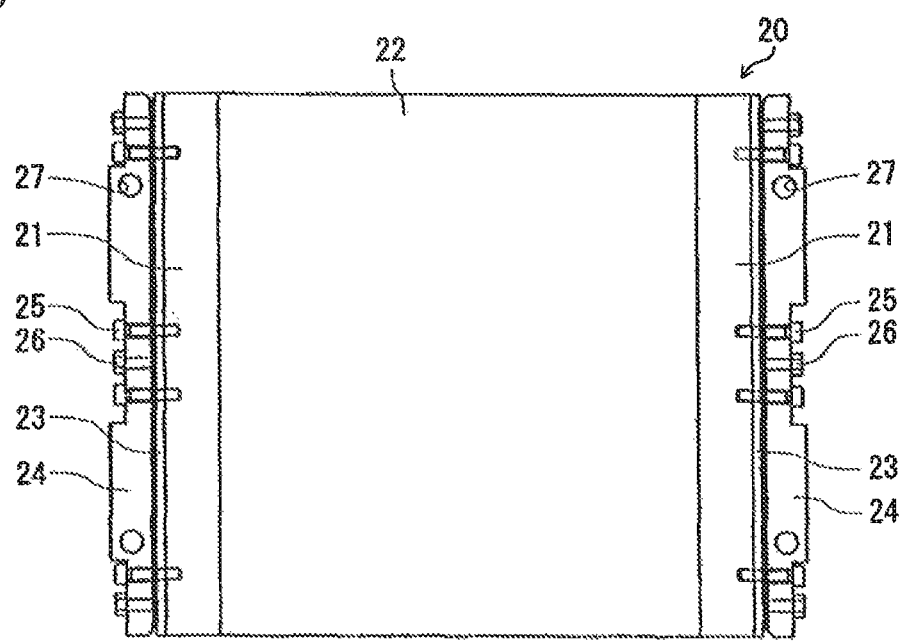

Fig. 3
(A)
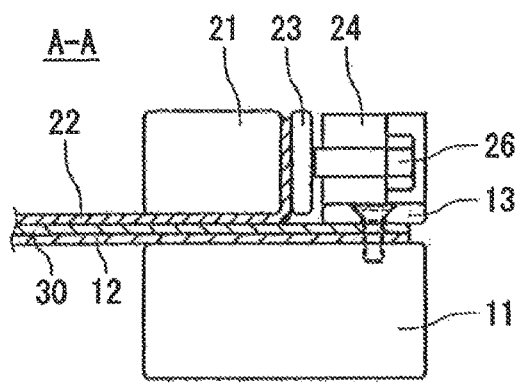
(B)
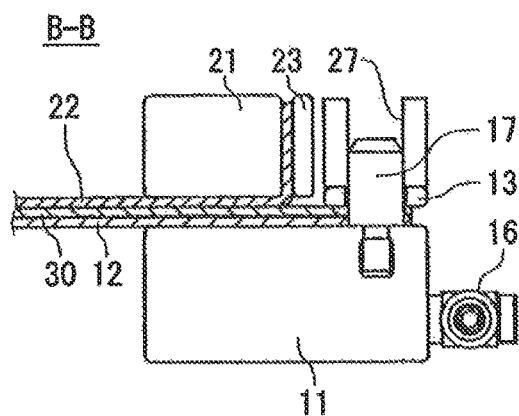
(C)
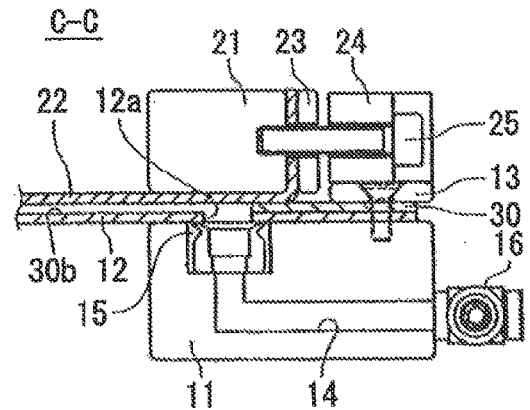
(D)
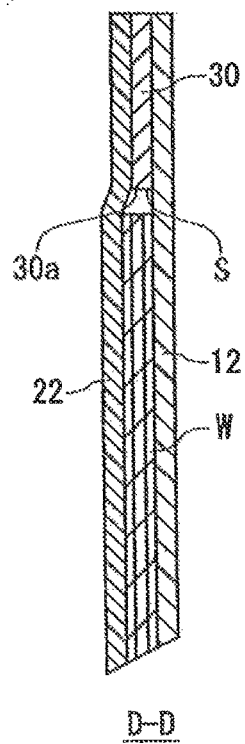

Fig. 4
(A)
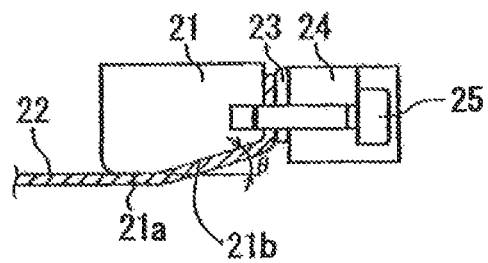
(B)
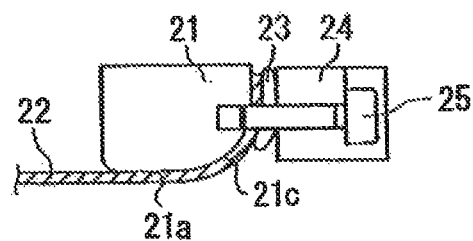
(C)
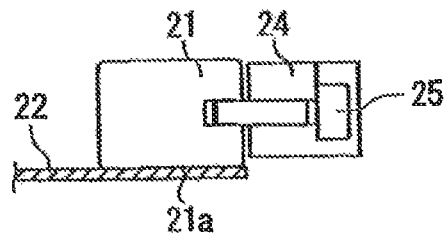
(D)
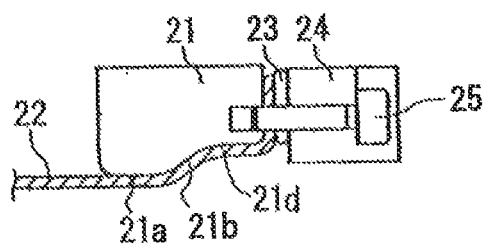

Fig. 6
(A)
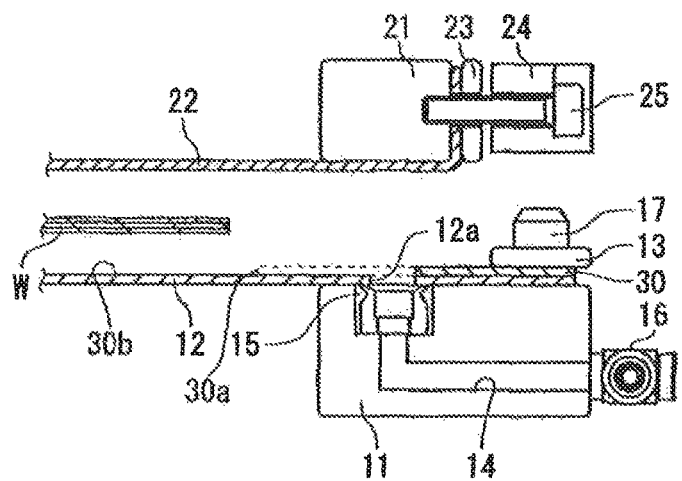
(B)
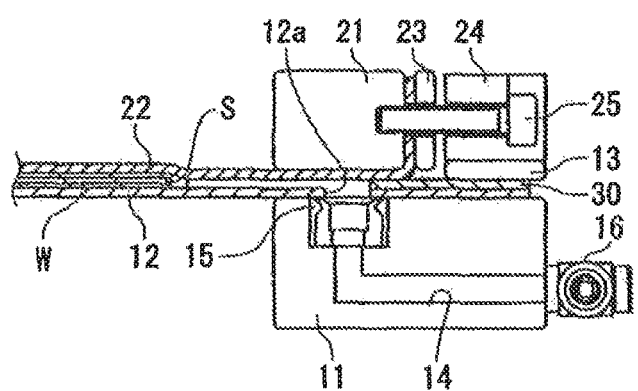
(C)
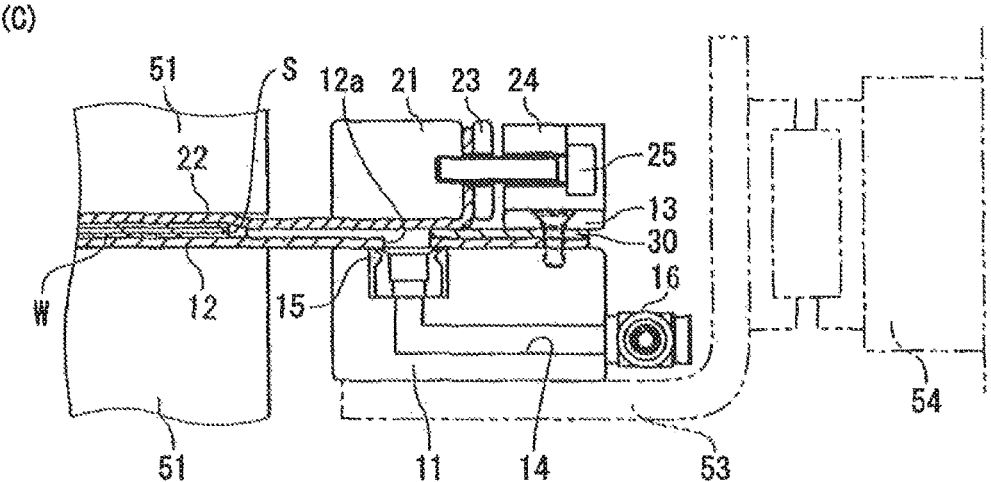

Fig. 7
(A)
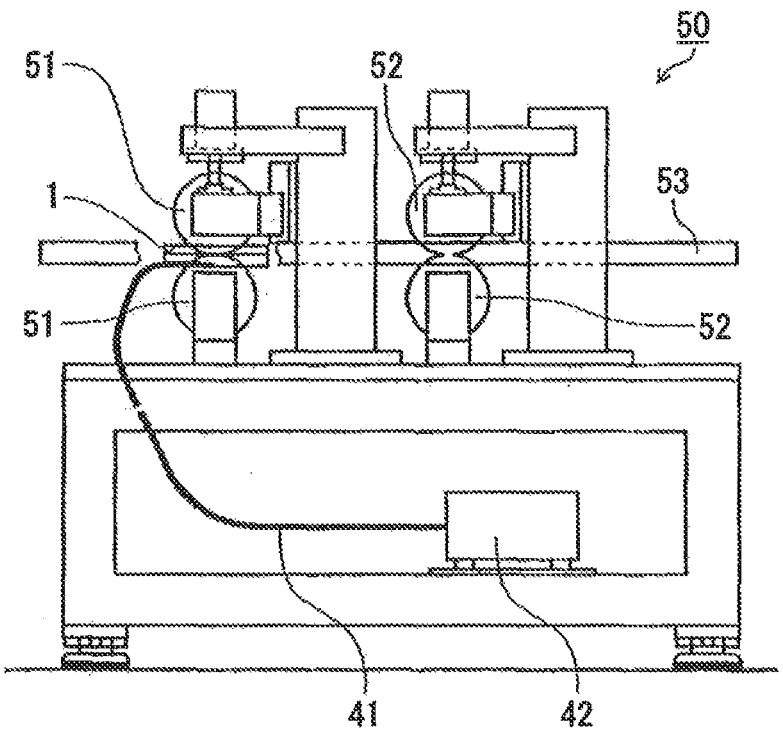
(B)
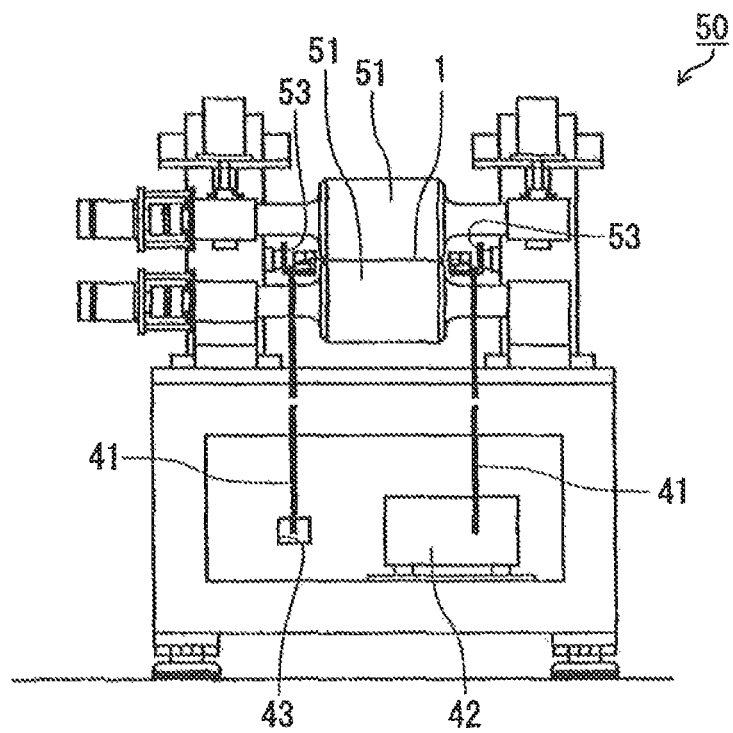

Fig. 8
(A)
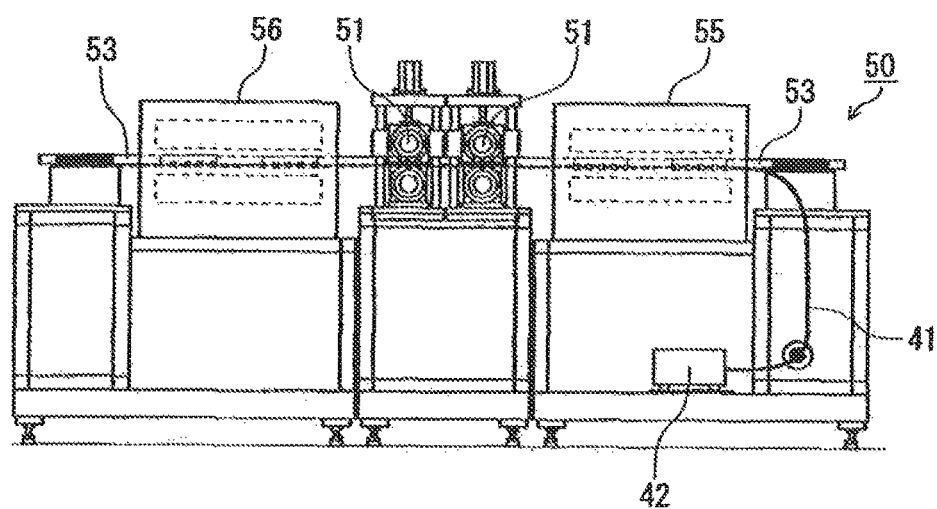
(B)
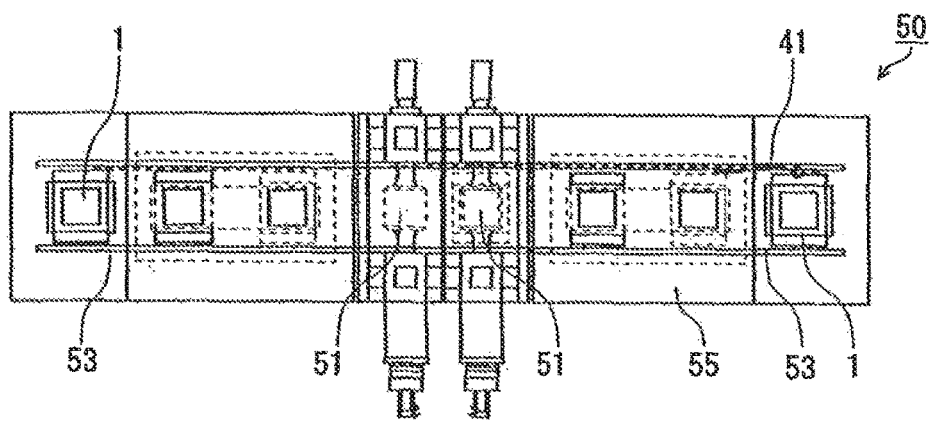

Fig. 11
(A)
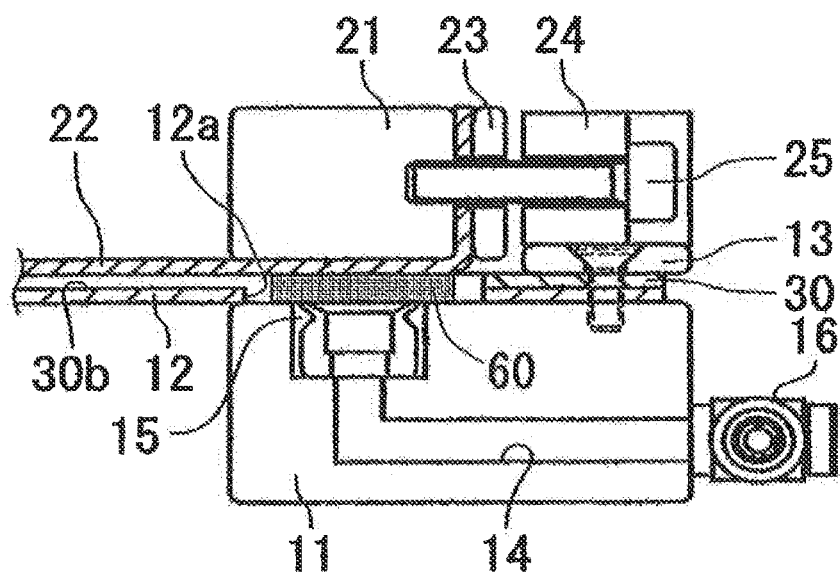
(B)
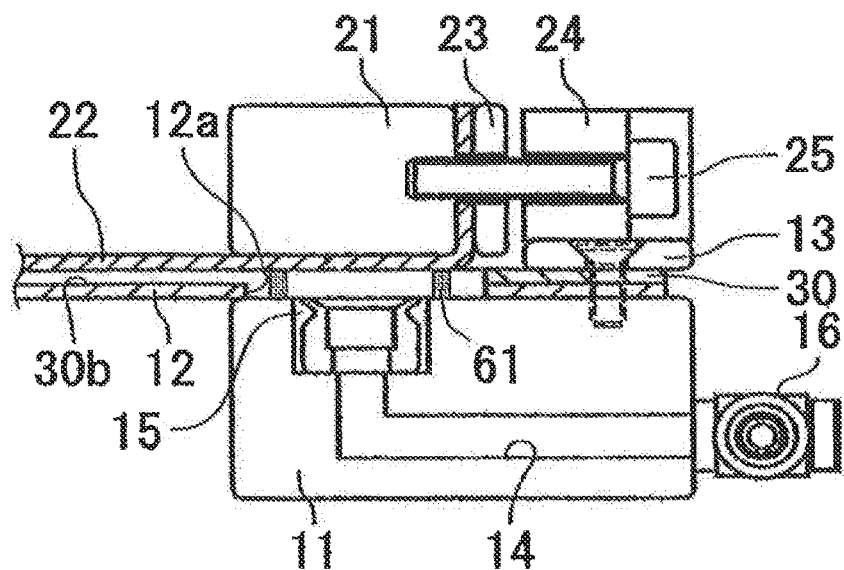

Fig. 12
(A)
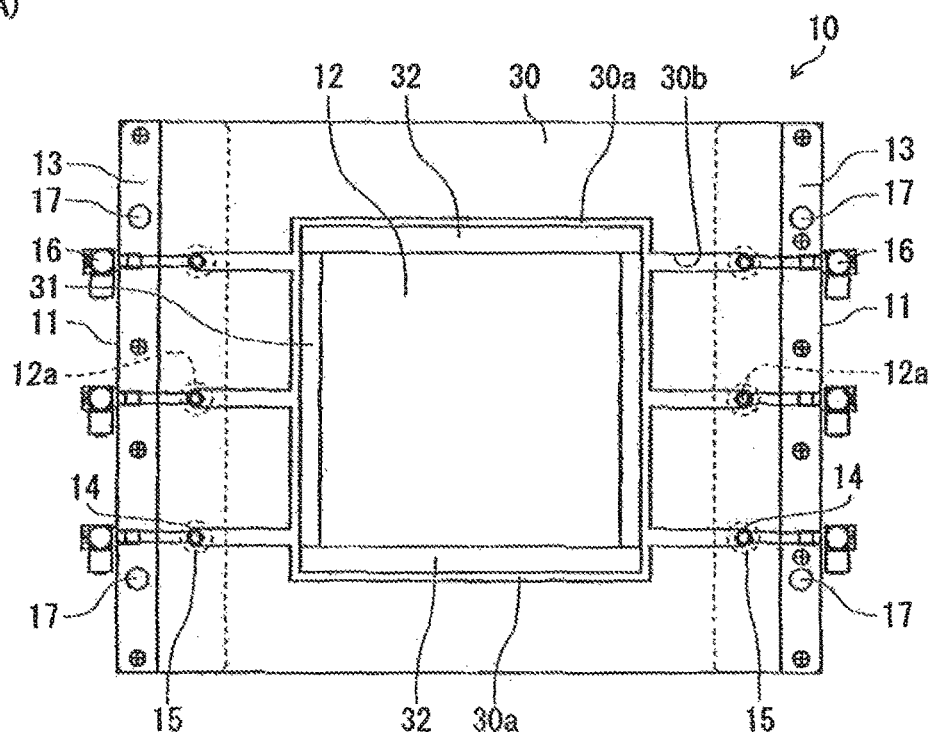
(B)
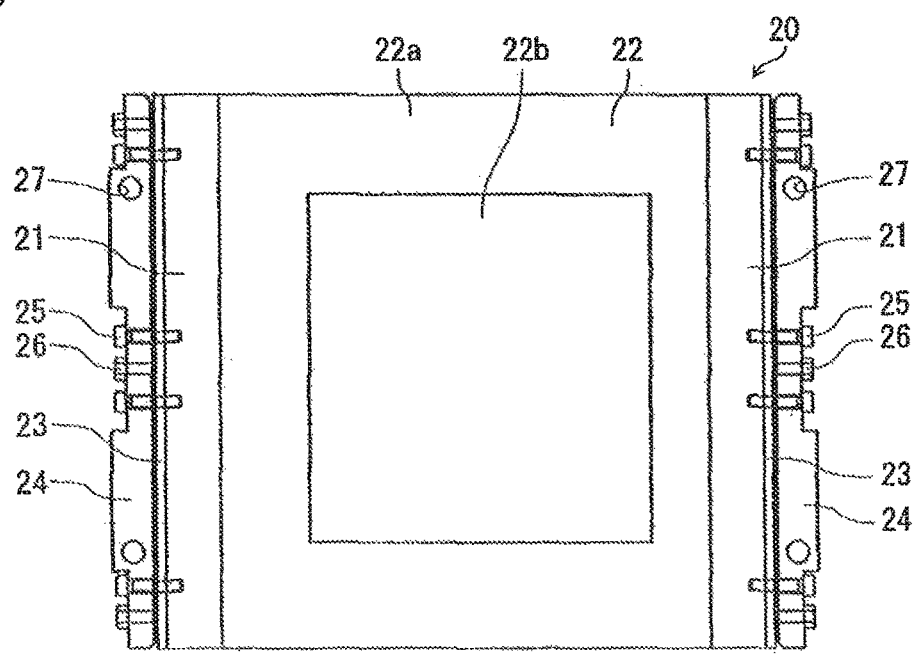

Fig. 14
(A)
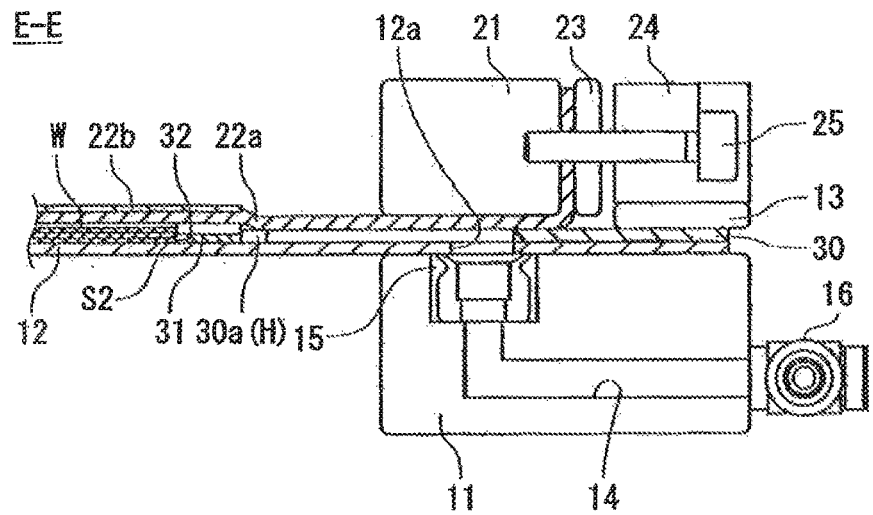
(B)
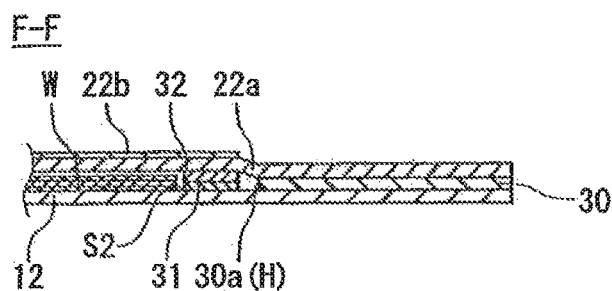
(C)
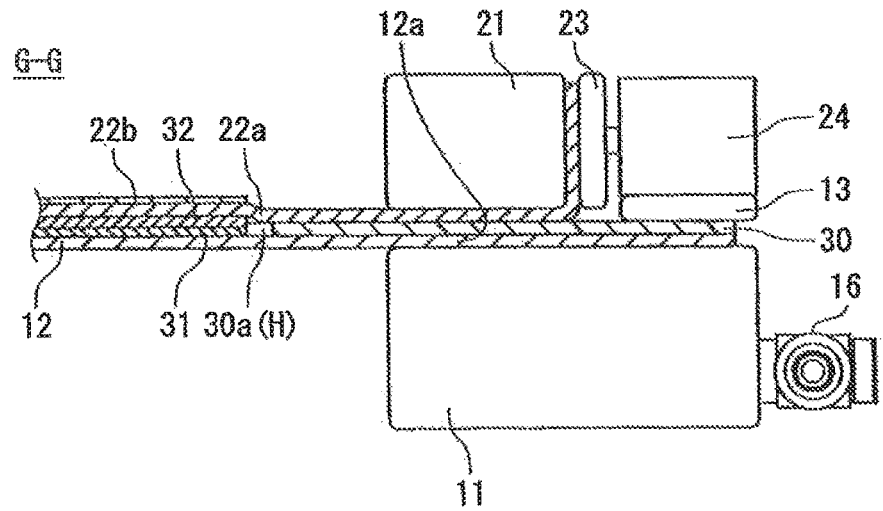

Fig. 16
(A)
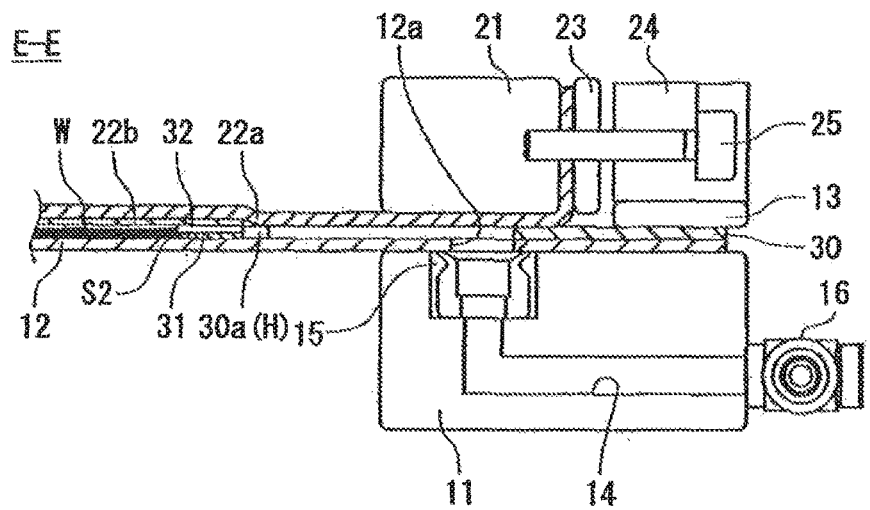
(B)
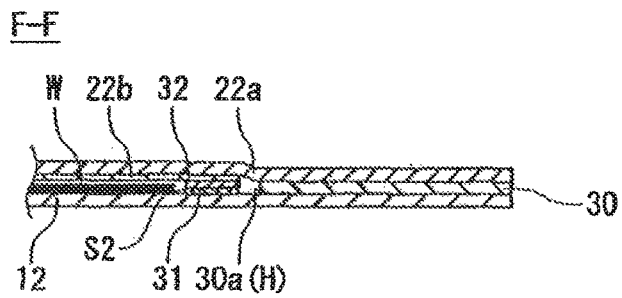
(C)
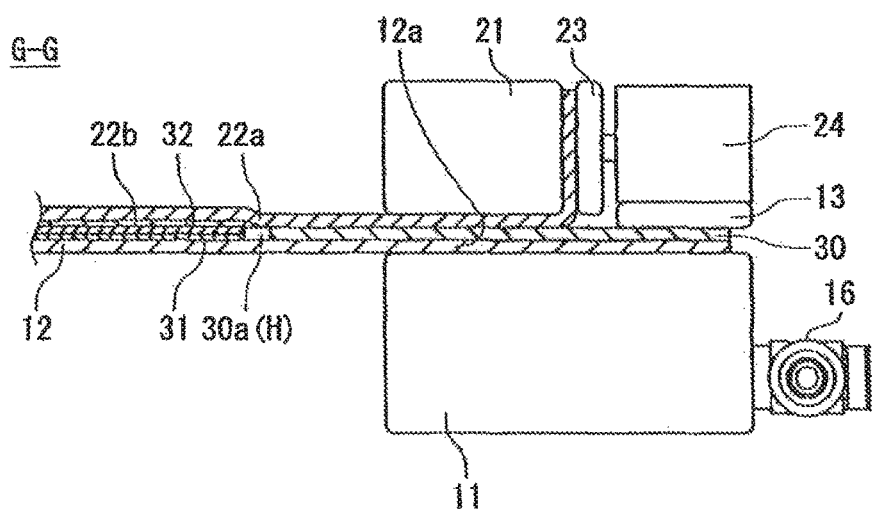

JIG FOR FIXING LAMINATED MATERIALS, A SYSTEM FOR MANUFACTURING BONDED LAMINATED MATERIALS, AND A METHOD FOR MANUFACTURING BONDED LAMINATED MATERIALS

TECHNICAL FIELD

The present invention relates to a jig for fixing laminated materials that is used for manufacturing bonded laminated materials, such as a membrane-electrode assembly for a solid polymer fuel cell, by pressing and bonding laminated materials. It also relates to a system for manufacturing bonded laminated materials and a method for manufacturing bonded laminated materials.

BACKGROUND ART

Conventionally, a rolling-pressing device has been used to manufacture bonded laminated materials by pressing and bonding materials having membranes. It presses the laminated materials between rollers that face one another while the materials are transported between them. This technology has recently been used for manufacturing a membrane-electrode assembly (MEA) for a solid polymer fuel cell, which is manufactured by laminating a polymer electrolyte, a fuel electrode, and an air electrode, and bonding them, (See, for example, Japanese Patent Laid-open publication No. 2008-159377, a published patent application, No. 2010-514102, i.e., a Japanese translation of the PCT international application that corresponds to WO2008/108898, and Japanese Patent Laid-open publication No. 2010-198948.)

When the laminated materials of the polymer electrolyte, the fuel electrode, and the air electrode are pressed and bonded by a rolling-pressing device in the conventional technology, the membranes may be misaligned or deformed due to a rapid change in the load or friction between the rollers and the laminated materials that is generated when the materials pass between the rollers. Thus the yield factor may decrease. Further, if air remains between the membranes that are laminated, it is difficult to fully discharge the air, to thereby cause a deficiency in bonding at the interface.

To solve the problem mentioned above, methods for fixing laminated materials are proposed wherein 1) laminated materials are placed on a flexible sheet that is attached to a metal frame for fixing a sheet, 2) another frame for fixing a sheet having a flexible sheet and an annular packing is placed over the metal frame, and 3) air is discharged from the sealed chamber that is formed as mentioned above to depressurize the chamber. (See, for example, Japanese Patent Laid-open Publication No. 2005-19275 and Japanese Patent Laid-open Publication No. 2008-446833.)

However, since the above-mentioned frames for fixing a sheet that surround laminated materials are thicker than the materials, they are not applicable to a device for continuous pressing such as rolling-pressing or double-belt type pressing devices. Thus the materials cannot be effectively manufactured. That is a problem.

The object of the present invention is to provide a jig for fixing laminated materials, a system for manufacturing bonded laminated materials, and a method for manufacturing bonded laminated materials, wherein the bonded laminated materials that are made by pressing and bonding materials made of membranes are effectively manufactured without causing any misaligned membranes, deformed materials, or deficient bonding at the interface, and at a good yield factor.

DISCLOSURE OF INVENTION

To achieve the object, the first aspect of the present invention is a jig for fixing laminated materials that is used for manufacturing bonded laminated materials by pressing and bonding materials made of membranes by means of a pressing device. The jig comprises a first fixing member having a pair of first columnar members that are disposed substantially in parallel to the direction the jig is to be transported to the pressing device and a first sheet-shaped member that is stretched between the pair of first columnar members by anchoring the ends to respective faces that extend in the longitudinal direction of the pair of first columnar members. It also comprises a second fixing member having a pair of second columnar members that face respective first columnar members and a second sheet-shaped member that is stretched between the pair of second columnar members by anchoring the ends to respective faces that extend in the longitudinal direction of the pair of second columnar members. It also comprises a sealing member that is disposed between the first sheet-shaped member and the second sheet-shaped member that are positioned by the pair of first columnar members and the pair of second columnar members, respectively, so as to face each other. The sealing member defines a housing space between the first sheet-shaped member and the second sheet-shaped member to house laminated materials. An exhaust passage is formed in at least one of the pair of the first columnar members to fluidly communicate with the housing space through an exhaust hole that penetrates the first sheet-shaped member. The exhaust passage is connected to an exhaust device.

When the laminated materials are located in the housing space and the space is exhausted by the exhaust device, the first sheet-shaped member and the second sheet-shaped member sandwich the laminated materials in the housing space to press the laminated materials that are transported to the pressing device while the laminated materials are fixed.

By the first aspect of the present invention, the materials made of laminated membranes are housed in the housing space that is formed by the first sheet-shaped member, the second sheet-shaped member, and the sealing member. The housing space is exhausted by the exhaust device. Thus the first sheet-shaped member and the second sheet-shaped member sandwich the laminated materials in the housing space. The sandwiched laminated materials are transported to the pressing device to be pressed and bonded, to thereby manufacture bonded laminated materials. Since the materials made of membranes are pressed and bonded while they are sandwiched in the exhausted housing space, bonded laminated materials can be effectively manufactured without causing any misaligned membranes, deformed materials, or deficient bonding at the interface, and at a good yield factor. Further, unlike a conventional fixing frame for maintaining a vacuum, since the faces in the direction to be transported are flat, a continuous pressing method, which is suitable for bulk production, can be used, not a batch-type pressing method such as a flat pressing method. Thus bonded laminated materials can be efficiently manufactured.

By the second aspect of the present invention, the jig for fixing the laminated materials of the first aspect comprises a member for forming the housing space that is a frame-shaped plate that is located between the first sheet-shaped member and the second sheet-shaped member that are arranged to face each other by the pair of first columnar members and the pair of second columnar members. The member for forming the housing space is formed to be thinner than the laminated materials. It separates the housing space into a second housing space for housing the laminated materials and a flow space around the second housing space that is fluidly connected to the exhaust hole.

By the second aspect of the present invention, since the housing space is separated by the member for forming the housing space into the second housing space and the flow space, the laminated materials can be accurately positioned in the second housing space. Further, the flow space for exhausting air can be secured. Thus an occlusion of the exhaust flow path caused by misaligned membranes, etc., can be prevented, to thereby securely exhaust the second housing space.

By the third aspect of the present invention, in the jig for fixing the laminated materials of the second aspect, the member for forming the housing space has a member for adjusting the thickness that increases the thickness of a part of the member for forming the housing space. The member for adjusting the thickness is configured to have the total thickness of the member for adjusting a thickness plus the member for forming the housing space be greater than that of the laminated materials.

By the third aspect of the present invention, since the total thickness of it and the member for forming the housing space are thicker than that of the laminated materials, a corner of the laminated materials can be prevented from being damaged by an excessive load when the pressing device starts to press the laminated materials. If a rolling-pressing device is used that presses the jig for fixing the laminated materials in the direction of transportation while transporting it, this construction is preferable because an excessive load may be applied to a corner of the laminated materials. Since a space is formed between the member for forming the housing space and the second sheet-shaped member, the second housing space is effectively exhausted through that space.

By the fourth aspect of the present invention, in the jig for fixing the laminated materials of one of the first, second, and third aspects, the first sheet-shaped member is made of metal.

If the first sheet-shaped member is made of metal as the fourth aspect of the present invention, that member has proper strength. Thus it is difficult to deform, such as to twist or to wrinkle, and so thereby prevents the exhaust hole from being deformed.

Further, since the heat conductivity is high, heat is effectively transferred to the laminated materials by means of the first sheet-shaped member when they are pressed by being heated or cooled.

By the fifth aspect of the present invention, in the jig for fixing the laminated materials of one of the first to fourth aspects, the second sheet-shaped member is made of resin material that is flexible.

If the second sheet-shaped member is made of resin material that is flexible, like the fifth aspect of the present invention, that member can bend along the outside of the laminated materials, in correspondence to the shape, when the housing space is exhausted, even if the laminated materials are thick. Thus the laminated materials are more securely fixed.

By the sixth aspect of the present invention, in the jig for fixing the laminated materials of the fifth aspect, the second sheet-shaped member is made of fiber-reinforced rubber.

If the second sheet-shaped member is made of fiber-reinforced rubber that has a low thermal expansion coefficient, like the sixth aspect of the present invention, any misalignment in the laminated materials or passing of air through the housing space that may be caused by a difference in thermal expansion between the second sheet-shaped member and another member can be prevented. Since that material is highly elastic and ductile and has a characteristic for returning to its original shape when an applied force is removed, it does not change its shape after repeated uses, and no flow space is occluded by the second sheet-shaped member that is deformed to take the shape of the exhaust passage. Since the second sheet-shaped member has a high buffering effect to maintain the constant pressure, no local pressure is applied to the laminated materials by the pressing device. Thus the laminated materials are subject to a uniform pressure. Since the second sheet-shaped member is durable, it is not damaged by any corner of the laminated materials or the jig. Further, as it is highly adhesive, it well seals the housing space, to increase a vacuum.

By the seventh aspect of the present invention, in the jig for fixing the laminated materials of the sixth aspect, the fiber-reinforced rubber is a rubberized cloth that is made by laminating and integrating rubber sheets on both faces of a foundation cloth.

A rubberized cloth that has both stiffness and ductility can be used for a fiber-reinforced rubber, as in the seventh aspect of the present invention.

By the eighth aspect of the present invention, in the jig for fixing the laminated materials of the seventh aspect, the rubber sheets are made of fluorine-containing rubber or silicon rubber.

By the ninth aspect of the present invention, in the jig for fixing the laminated materials of the seventh or eighth aspect, the foundation cloth is made from glass fibers or heat-resistant synthetic fibers that are used to seal the housing space at a temperature that the jig is operating.

If the rubberized cloth is made of the material as in the eighth or ninth aspect of the present invention, its heat resistance is improved, so it can be used for the jig, which is preferably used at a high temperature.

By the tenth aspect of the present invention, in the jig for fixing the laminated materials of any of the fifth to ninth aspects, the second sheet-shaped member has a member for adding stiffness that is made of a material that is flexible and harder than the resin material and that is formed as a plate that is the same size as, or larger than, the laminated materials, and smaller than the housing space.

By the tenth aspect of the present invention, since the member for adding stiffness adds a certain stiffness to the second sheet-shaped member, the second sheet-shaped member is prevented from entering the concaves of the laminated materials to otherwise stick on them, even when the laminated materials have concaves and convexes. If the raw material for the laminated materials can easily stick on the second sheet-shaped member, the laminated materials are prevented from being damaged Further, since the member for adding stiffness is formed to have the size as discussed. above, the laminated materials are securely fixed and uniformly pressed. Since the second sheet-shaped member is firmly attached to the sealing member, the housing space is securely sealed.

By the eleventh aspect of the present invention, in the jig for fixing the laminated materials of any of the first to tenth aspects, a spacer is provided inside the housing space or the flow space to prevent the exhaust hole from being occluded when the housing space is exhausted, wherein the spacer is configured to allow air to pass through it.

By the eleventh aspect of the present invention, since the second sheet-shaped member is prevented by the spacer from being sucked into the exhaust hole when the housing space is exhausted by the exhaust device, the exhaust hole is prevented from being occluded, which would thereby cause the housing space to not be sufficiently exhausted.

By the twelfth aspect of the present invention, in the jig for fixing the laminated materials of any of the first to eleventh aspects, the sealing member is formed to be integral with the first sheet-shaped member.

If the sealing member is formed to be integral with the first sheet-shaped member as in the twelfth aspect of the present invention, the position of the housing space is not displaced.

By the thirteenth aspect of the present invention, in the jig for fixing the laminated materials of any of the first to twelfth aspects, the sealing member is made of heat-resistant rubber.

If the sealing member is made of heat-resistant rubber, such as silicon rubber, as in the thirteenth aspect of the present invention, the housing space is securely sealed even when the sealing member is thin, because the rubber is adhesive. Even if the laminated materials are thin, the thickness of the sealing member can be reduced to securely fix the laminated materials. When the sealing member is pressed by the pressing device no excessive load is applied. Further, since it is heat-resistant, it is preferably used to press and bond the laminated materials while they are heated at a high temperature.

By the fourteenth aspect of the present invention, in the jig for fixing the laminated materials of any of the first to twelfth aspects, the sealing member is made of metal.

If the sealing member is made of metal, such as stainless steel, as in the fourteenth aspect of the present invention, the cost for manufacturing the jig for fixing the laminated materials can be reduced, since the cost of the metal is lower than that of the heat-resistant rubber, and metal is easily processed. Further, as metal is durable and heat resistant, it can be repeatedly used. It is preferably used to press and bond the laminated materials while it is being heated at a high temperature.

By the fifteenth aspect of the present invention, in the jig for fixing the laminated materials of any of the first to fourteenth aspects, the sealing member is formed to have a certain thickness so as to have it avoid any load from the pressing device being applied.

If the sealing member is formed to have a certain thickness so that no load from the pressing device can be applied when it is pressed by the pressing device, then, as in the fifteenth aspect of the present invention, all of the pressing force is applied to the laminated materials. Thus a load is effectively applied to the laminated materials.

By the sixteenth aspect of the present invention, in the jig for fixing the laminated materials of any of the first to fourteenth aspects, the sealing member is made of a raw material that is harder than the laminated materials and is formed to have a certain thickness so that a load from the pressing device that is applied by the pressing device to the laminated materials is small, so as not to substantially deform the sealing member.

If the sealing member that is formed is made of a raw material that is harder than the laminated materials and is formed to have a certain thickness so that a load from the pressing device that is applied by the pressing device to the laminated materials is small so as not to substantially deform them, the laminated materials are made as thick as the sealing member. Thus, bonded laminated materials that have a constant thickness can be manufactured.

By the seventeenth aspect of the present invention, in the jig for fixing the laminated materials of any of the first to sixteenth aspects, an exhausting portion that is a passage to connect the housing space to the exhaust hole is formed. Its end that is not connected to the housing space is formed to have the width of the outer face be larger than that of the exhausting portion. A portion for smoothing the deformation, which portion has curves on the outer face, is smoothly connected to the exhausting portion, which has no corner. The exhaust hole is formed between the housing space and the portion for smoothing the deformation.

Since the portion for smoothing the deformation at the end of the exhausting portion is formed so as not to locally deform the second sheet-shaped member at the exhausting portion when the housing space is exhausted, as in the seventeenth aspect of the present invention, a possibility of not being sufficiently exhausted, for example, by wrinkles that could be generated, is reduced. Further, since the area of the portion for smoothing the deformation is larger than that of the end of the exhausting portion, the exhaust hole can be formed at the middle of the exhaust passage in the exhausting portion, so as not to be occluded. If the exhaust hole is formed in the portion for smoothing the deformation, it may be occluded by the second sheet-shaped. member that is sucked into it. Thus the housing space is securely exhausted.

By the eighteenth aspect of the present invention, in the jig for fixing the laminated materials of any of the first to sixteenth aspects, an exhausting portion that is a passage to connect the housing space to the exhaust hole is formed in the shape of a loop. The exhaust hole is formed in the passage in the shape of a loop.

By the eighteenth aspect of the present invention, since the exhaust hole is formed in the passage in the shape of a loop, there is no area in the exhausting portion where the deformation in the second sheet-shaped. member becomes large in a small area. Thus, when the housing space is exhausted, a possibility of not being sufficiently exhausted, for example, by generated wrinkles, is reduced so that the housing space is securely exhausted.

By the nineteenth aspect of the present invention, in the jig for fixing the laminated materials of any of the first to eighteenth aspects, a cover for the flow path that covers at least a portion of the exhausting portion is provided between the second sheet-shaped member and the sealing member, so that the exhausting portion is prevented from being occluded by the second sheet-shaped member. The exhausting portion is a flow path to connect the housing space to the exhaust hole.

By the nineteenth aspect of the present invention, since the cover for the flow path prevents the second sheet-shaped member from being sucked into the exhausting portion during exhausting, occluding the exhausting portion by the second sheet-shaped member to cause insufficient exhausting from the housing space is prevented, so that the housing space is securely exhausted.

By the twentieth aspect of the present invention, in the jig for fixing the laminated materials of any of the first to nineteenth aspects, the second. columnar member has an inclined portion that outwardly inclines, or a rounded portion that is formed at the outer end, in the contact portion that faces the first columnar member and contacts the second sheet-shaped member.

If the second sheet-shaped member is made of a rigid material, it may be difficult to seal the housing space, since the second sheet-shaped member is not firmly attached to the sealing member. This is because, when the second sheet-shaped member is bent along and fixed to the second columnar member, it outwardly curls up to loosen a large deformation in a local area. This occurs especially when the second sheet-shaped member is bent at a large angle, for example, at θ=90° in FIG. 4(A), to the plane of the second sheet-shaped member, which is stretched between the pair of second columnar members. However, by the twentieth aspect of the present invention, since the second columnar member has an inclined portion or a rounded portion in the contact portion that faces the first columnar member and contacts the second sheet-shaped member, no large deformation in a small area occurs in the second sheet-shaped member by placing it along, and fixing it to, the inclined portion or the rounded portion that is formed on the contact portion of the second columnar member. Thus it can be bent along the second columnar member. Thus the second sheet-shaped member does not outwardly curl up. As a result, the second sheet-shaped member can be firmly attached to the sealing member to seal the housing space.

The twenty-first aspect of the present invention is a system for manufacturing bonded laminated materials by using the jig for fixing the laminated materials of any of the first to twentieth aspects. It comprises a pressing device for pressing and bonding the materials made of membranes, an exhaust device that exhausts the housing space in the jig for fixing the laminated materials, and a transporting device for transporting the jig for fixing the laminated materials to the pressing device.

By the twenty-first aspect of the present invention the laminated materials are fixed by exhausting the housing space by means of the exhaust device by using the jig for fixing the laminated materials of any of the first to twentieth aspects. The transporting device transports the jig for fixing the laminated materials that fixes the laminated materials to the pressing device. The pressing device presses and bonds the laminated materials to manufacture bonded laminated materials.

Thus the laminated materials, which are made by laminating membranes, can be pressed and bonded while they are firmly attached to each other in the housing space that is exhausted. As a result, bonded laminated materials that have no misalignment of membranes, no deformation, and no deficiency in bonding at the interface, are manufactured at a good yield factor.

Further, unlike a conventional fixing frame for maintaining a vacuum, since the faces in the direction to be transported are flat, a device for continuous pressing, which is suitable for bulk production, can be used, not a batch-type pressing device such as a flat pressing device. Thus bonded laminated materials can be efficiently manufactured.

By the twenty-second aspect of the present invention, in the system for manufacturing bonded laminated materials of the twenty-first aspect of the present invention, a preheating portion that preliminarily heats the jig for fixing the laminated materials is provided at the upstream side of the pressing device in the direction for transporting the jig.

If the system for manufacturing bonded laminated materials comprises a preheating portion as in the twenty-second aspect of the present invention, pressing is not carried out before the laminated materials are sufficiently heated. This occurs especially when the period that the jig for fixing the laminated materials contacts the pressing device is short, resulting in insufficient heat being transferred from the heating rollers to the jig or laminated materials. To carry out bulk production, since the jig for fixing the laminated materials is pressed at a high speed, this structure is preferably used to sufficiently heat the laminated materials.

By the twenty-third aspect of the present invention, in the system for manufacturing bonded laminated materials of the twenty-first or twenty-second aspect of the present invention, a portion for removing residual heat that cools the jig for fixing the laminated materials is provided at the downstream side of the pressing device in the direction for transporting the jig.

If the system for manufacturing bonded laminated materials comprises a portion for removing residual heat as in the twenty-third aspect of the present invention, the time to cool the bonded laminated materials that have been manufactured is shortened, so that they can be quickly transferred to the next step. Thus the productivity is improved. Further, the safety, such as preventing burns to an operator, is improved, since the jig for fixing the laminated materials would not be taken out until the heat of the laminated materials is sufficiently dissipated. The dissipation may take a long time for a jig that has a large heat capacity.

By the twenty-fourth aspect of the present invention, by the method of manufacturing bonded laminated materials a jig for fixing laminated materials is prepared. The jig comprises materials made of membranes; a first fixing member having a pair of first columnar members that are disposed substantially in parallel to the direction the jig is to be transported to the pressing device and a first sheet-shaped member that is stretched between the pair of first columnar members by anchoring the ends to respective faces that extend in the longitudinal direction of the pair of first columnar members; a second fixing member having a pair of second columnar members that face respective first columnar members and a second sheet-shaped member that is stretched between the pair of second columnar members by anchoring the ends to respective faces that extend in the longitudinal direction of the pair of second columnar members; and a sealing member that is disposed between the first sheet-shaped member and the second sheet-shaped member that are positioned by the pair of first columnar members and the pair of second columnar members, respectively, so as to face each other. The sealing member defines a housing space between the first sheet-shaped member and the second sheet-shaped member to house the laminated materials. An exhaust passage is formed in at least one of the pair of first columnar members to fluidly communicate with the housing space through an exhaust hole that penetrates the first sheet-shaped member. The method comprises the steps of placing the laminated materials in the housing space; fixing the laminated materials in the housing space by sandwiching them by means of the first sheet-shaped member and the second sheet-shaped member by exhausting the housing space by an exhaust device; and pressing and bonding the laminated materials that are fixed and are transported to the pressing device.

By the twenty-fourth aspect of the present invention, laminated materials are placed in the housing space that is formed by the first sheet-shaped member, the second sheet-shaped member, and the sealing member, in the placing step. In the fixing step, the first sheet-shaped member and the second sheet-shaped member sandwich and fix the laminated materials placed in the housing space. In the pressing step, the laminated materials that are fixed in the fixing step are transported to the pressing device to be pressed and bonded so that bonded laminated materials are manufactured. By doing so, since the laminated materials that are made by laminating membranes are sandwiched and fixed by exhausting the housing space, to then be pressed and bonded, bonded laminated materials that have no misalignment of membranes, no deformation, and no deficiency in bonding at the interface, can be manufactured at a good yield factor. Unlike a conventional fixing frame for maintaining a vacuum, since the faces in the direction to be transported are flat, a continuous pressing method, which is suitable for bulk production, can be used, not a batch-type pressing method such as a flat pressing method. Thus bonded laminated materials can be efficiently manufactured.

The basic Japanese patent applications, No. 2011-014646, filed Jan. 27, 2011, No. 2011-129704, filed Jun. 10, 2011, and No. 2011-226776, filed Oct. 14, 2011, are hereby incorporated by reference in their entireties in the present application.

The present invention will become more fully understood from the detailed description given below. However, the detailed description and the specific embodiments are only illustrations of the desired embodiments of the present invention, and so are given only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural, unless otherwise indicated herein or clearly contradicted by the context. The use of any and all examples, or exemplary language (e.g., "such as") provided herein is intended merely to better illuminate the invention, and so does not limit the scope of the invention, unless otherwise stated.

BRIEF DESCRIPTION OF DRAWINGS

FIG. 1 illustrates the structure of the jig for fixing the laminated materials of the first embodiment. FIG. 1(A) is a plan view of the first fixing jig and the sealing member. FIG. 1(B) is a plan view of the second fixing jig.

FIG. 3 is a sectional view showing the laminated materials that are placed in the jig for fixing the laminated materials of the first embodiment. FIG. 3(A) is a sectional view shown by arrows A-A in FIG. 2. FIG. 3(B) is a sectional view shown by arrows B-B in FIG. 2. FIG. 3(C) is a sectional view shown by arrows C-C in FIG. 2. FIG. 3(D) is a sectional view shown by arrows D-D in FIG. 2.

FIG. 4 is a sectional view showing variations for fixing the second sheet-shaped member to the second columnar member.

FIG. 5(A) is a sectional view. FIG. 5(B) is a plan view as shown from the top in FIG. 5(A).

FIG. 6 illustrates the procedure for manufacturing the bonded laminated materials by the first embodiment. FIGS. 6(A), (B), and (C) are sectional views in the placing step, the fixing step, and the pressing step, respectively.

FIG. 7 illustrates a schematic structure of the machine for manufacturing bonded laminated materials. FIG. 7(A) is a side view. FIG. 7(B) is a front view shown from the direction for transporting the jig for fixing laminated materials.

FIG. 8 schematically illustrates the structure of the machine for manufacturing bonded laminated materials. FIG. 8(A) is a side view. FIG. 8(B) is a plan as shown from the top.

FIG. 11 is a sectional view of the spacer that is placed in the exhausting portion of the sealing member.

FIG. 12 illustrates the structure of the jig for fixing the laminated materials of the second embodiment. FIG. 2(A) is a plan view of the first fixing jig and the sealing member. FIG. 2(B) is a plan view of the second fixing jig.

FIG. 14 is a sectional view showing the laminated materials that are placed in the jig for fixing the laminated materials of the second embodiment. FIG. 14(A) is a sectional view shown by arrows E-E in FIG. 13. FIG. 14(B) is a sectional view shown by arrows F-F in FIG. 13. FIG. 14(C) is a sectional view shown by arrows G-G in FIG. 13.

FIGS. 16(A), (B), and (C) are sectional views in the placing step, the fixing step, and the pressing step, respectively.

FIG. 16 shows sectional views of variations of the jig for fixing the laminated materials of the second embodiment. FIGS. 16(A), (B), and (C) correspond to sectional views shown by arrows E-E, F-F, and G-G in FIG. 13, respectively.

FIGS. 19(A) and (B) are a front view shown from the direction for transporting the jig for fixing the laminated materials and a side view, respectively.

FIGS. 20(A) and (B) are a plan view shown from the top and a side view, respectively.

BEST MODE FOR CARRYING OUT THE INVENTION

[First Embodiment]

The jig for fixing laminated materials, the system for manufacturing bonded laminated materials, and the method for manufacturing bonded laminated materials of the present invention are, by taking the MEA as an example, now described with reference to the drawings.

Figure 2:
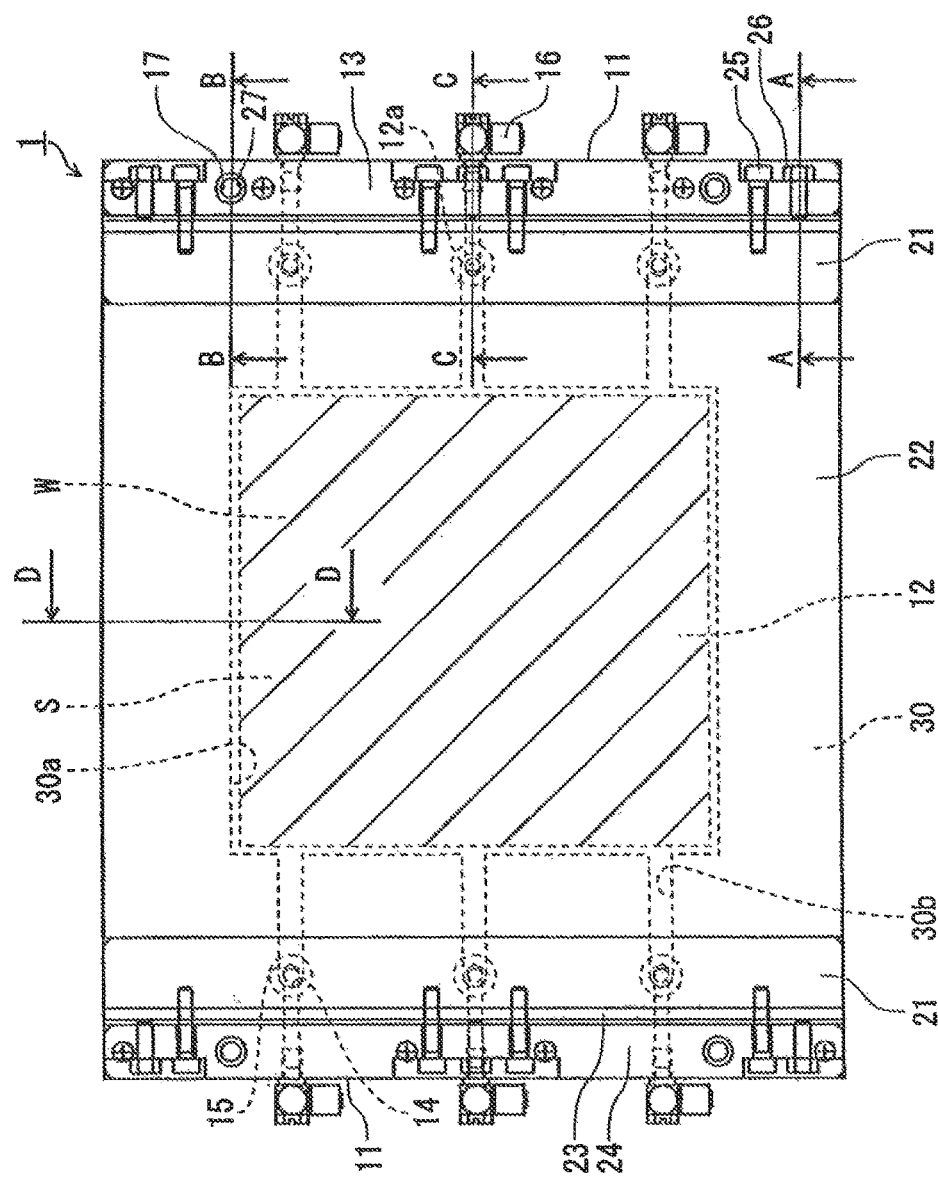
FIG. 2 is a plan view showing the laminated materials that are placed in the jig for fixing the laminated materials of the first embodiment.

The structure of the jig 1 for fixing laminated materials is described with reference to FIGS. 1, 2, and 3. The jig 1 for fixing laminated materials comprises a first fixing member 10 that is connected to an exhaust device, a second fixing member 20 that is used in combination with the first fixing member 10, and a sealing member 30.

The first fixing member 10 is formed by spreading a first sheet-shaped member 12 between first columnar members 11, 11 that are disposed substantially parallel to the direction to be transported toward a machine 50 for manufacturing bonded laminated materials, which is described below. The first columnar members 11 are formed by rectangular columns. The first sheet-shaped member 12 is formed by a flexible belt. In this embodiment, the first sheet-shaped member 12 is made of a stainless steel, which is a metallic material.

The ends of the first sheet-shaped member 12, together with the sealing member 30, are fixed by a plate-like first stopper 13 (see FIG. 3(A)) to respective faces of the first columnar members Ii, which faces extend in the longitudinal direction.

A vacuum pump 42 (see FIG. 7) is connected to the first columnar members 11 via an exhaust port 16 and a vacuum piping 41. In the first columnar members 11 an exhaust passage 14 that is fluidly connected to a housing space S is formed. The housing space S is discussed later.

In a region where the first sheet-shaped member 12 contacts the first columnar member 11, an exhaust hole 12a is formed to penetrate the first sheet-shaped member 12 at a position corresponding to the opening of the exhaust passage 14. In this embodiment, three exhaust holes 12a are formed in each of the first columnar members 11 to fluidly communicate with the exhaust passages 14 via vacuum pads 15. Though the exhaust passages 14 are formed in each of the first columnar members 11, they may be formed in only one of the first columnar members 11.

The first columnar members 11 have a positioning pin 17 that positions second columnar members 21 that are located to face the respective first columnar members 11.

The second fixing member 20 is formed by spreading a second sheet-shaped member 22 between second columnar members 21, 21 that are disposed to face the respective first columnar members 11. The second sheet-shaped member 22 is formed by a flexible belt. In this embodiment it is made of Teflon (a registered trademark), which is a plastic material. The shape of the second sheet-shaped member 22, which is located between the second. columnar members 21, 21, is substantially the same as that of the first sheet-shaped member 12, which is located between the first columnar members 11, 11.

The second sheet-shaped member 22 bends along the second columnar members 21. It is fixed to the side faces of them by the second stopper 24 via a retainer plate 23. As seen in FIGS. 3(A) and (C), the second stopper 24 is equipped with a fixing screw 25 that penetrates through the retainer plate 23 and fixes the second sheet-shaped member 22 by pressing the retainer plate 23 against the second columnar member 21. It is also equipped with an adjusting screw 26 that adjusts the position where the second columnar member 21 is to be pressed.

In the second stopper 24 a positioning hole 27 is formed to penetrate through it for positioning the second fixing member 20 through which the positioning pin 17 of the first fixing member 10 runs.

The sealing member 30 is disposed between the first sheet-shaped member 12 and the second sheet-shaped member 22, which are positioned both by the first columnar member 11, 11 and the second columnar member 21, 21, respectively, to face each other. In the sealing member 30 the space that is formed by the first sheet-shaped member 12 and second sheet-shaped member 22 that face each other is divided into a housing portion 30a for housing the laminated materials W and an exhausting portion 30b that is connected to the housing portion 30a. The exhausting portion 30b exhausts the housing space 5, which is an enclosed space defined by the first sheet-shaped member 12, the second sheet-shaped member 22, and the housing portion 30a. Since the sealing member 30 is sandwiched by the first sheet-shaped member 12 and the second sheet-shaped member 22, it functions as the side walls of the housing space S.

The exhausting portion 30b is fluidly connected to the housing portion 30a and extends toward the first columnar member 11, it is configured to face the exhaust hole 12a of the first sheet-shaped member 12. To prevent the laminated materials W that are housed in the housing portion 30a from moving, the exhausting portion 30b is made smaller than the housing portion 30a.

In this embodiment the sealing member 30 is made of silicon rubber, which is heat-resistant. It is formed to have a thickness so as not to receive a substantial load when the laminated materials W are pressed and bonded, FIG. 1(A) shows the housing portion 30a, which is rectangular. However, it is arbitrarily shaped so as to be suitable to the shape of the laminated materials W.

Heat-resistant rubber, especially silicon rubber, is preferably used for the sealing member 30. Since the silicon rubber is adhesive, the sealing member 30 securely seals the housing space S even if it is thin. Even if the laminated materials W are thin, the sealing member 30 would still be thin enough to securely seal it. Further, an excessive load can be avoided from being generated by hot-pressing rollers 51 or cold-pressing rollers 52, which are discussed below. Since silicon rubber is highly heat resistant, it is preferably used to heat the laminated materials W so that they can be pressed and bonded.

In the jig 1 for fixing laminated materials, as discussed above, the laminated materials W are disposed in the housing space S and the housing space S is exhausted by the vacuum pump 42. Thus the laminated materials W are sandwiched by the first sheet-shaped member 12 and the second sheet-shaped member 22 so as to be fixed by the first sheet-shaped member 12 and the second sheet-shaped member 22 that contact the laminated materials W.

The way to fix the first sheet-shaped member 12 and the second sheet-shaped member 22 to the first columnar members 11 and the second columnar members 21, respectively, is not necessarily that way discussed above. An adhesive agent may be used to do so, for example.

When the second sheet-shaped member 22 is bent along and fixed to the second columnar member 21, it outwardly inclines to reduce any large deformation that is generated in a small area. This occurs especially when the second sheet-shaped member 22 is bent at a large angle, for example, at θ=90° in FIG. 4(A), to the plane of the second sheet-shaped member 22, which is stretched between the pair of second columnar members 21. If the second sheet-shaped member 22 is made of a rigid material, it may be difficult to seal the housing space S, since the second sheet-shaped member 22 would not be firmly attached to the sealing member 30. If the sheet-shaped member 22 is made of such material, it is preferable to utilize the fixing methods shown in FIG. 4. For example, as in FIG. 4(A), an inclined portion 21b may be formed on a lower face 21a (a contact portion with the second sheet-shaped member 22) of the second columnar member 21, which faces the first columnar member 11. The inclined portion 21b outwardly inclines at θ<90°. Thus the force to outwardly incline the second sheet-shaped member 22 is reduced. Alternatively, as shown in FIG. 4(B), a round portion 21c that has a circular face in a cross section at the end of the lower face 21a of the second columnar member 21 may be formed to smooth the corner. Thus the force to outwardly incline the second sheet-shaped member 22 is reduced. As shown in FIG. 4(C), the second sheet-shaped member 22 may be bonded by an adhesive agent to the lower face 21a of the second columnar member 21. As shown in FIG. 4(D), an even portion 21d and the inclined portion 21b that inclines toward the lower face 21a of the second columnar member 21 are formed to deform the second sheet-shaped member 22 in stages. Thus the force to outwardly incline the second sheet-shaped member 22 is reduced. In any case, since the degree of a bend to bend the second sheet-shaped member 22 along the lower face 21a can be reduced (for example, θ in FIG. 4(A) becomes less than 90°), no large local deformation is generated in the second sheet-shaped member 22. Thus the second sheet-shaped member 22 can be bent along the second columnar member 21. Accordingly, since the second sheet-shaped member 22 does not outwardly curl up, it is firmly attached to the sealing member 30 so that the housing space S is securely sealed.

The number and positions of exhaust holes 12a can be arbitrarily determined based on the size and shape of the housing space S.

The first sheet-shaped member 12 may be integral with the sealing member 30. If so, the position of the housing space S is not displaced. The sealing member 30 may be fixed to the second columnar member 21 and disposed at the side near the second sheet-shaped member 22.

Next, a method for manufacturing bonded laminated materials is discussed. This method is preferably utilized to manufacture an MEA for a solid polymer fuel cell.

Figure 5:
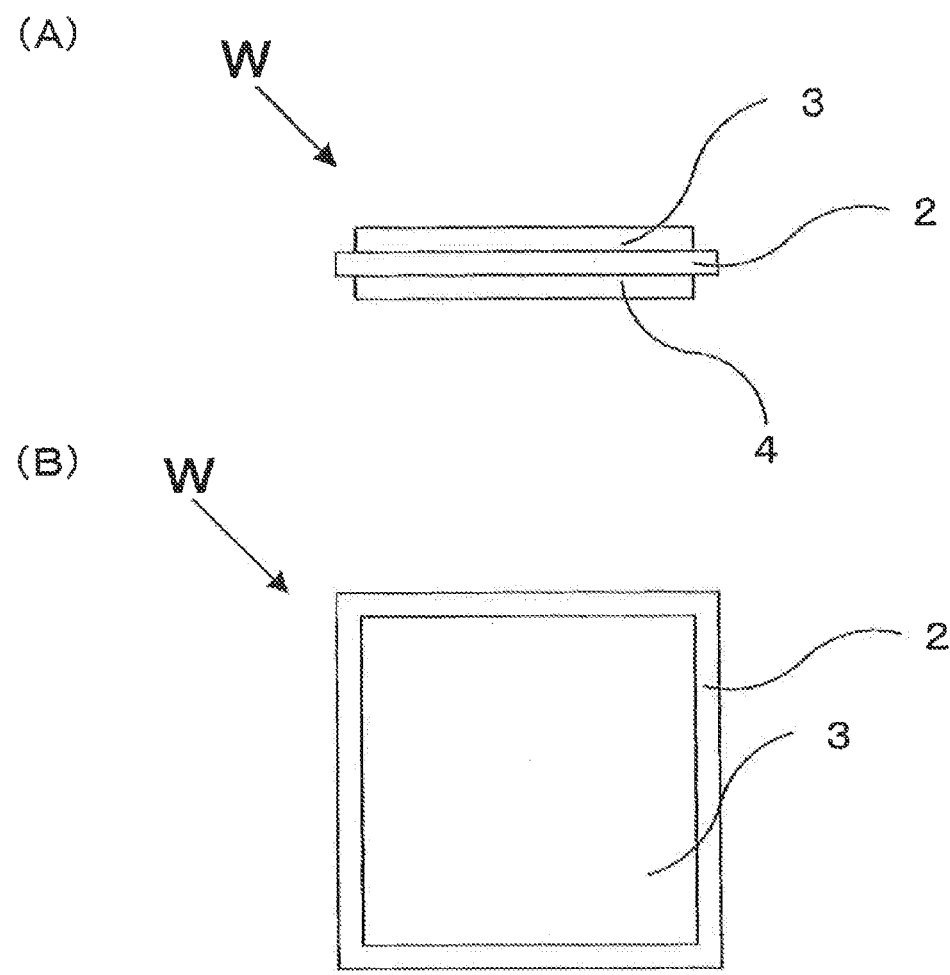
FIG. 5 illustrates the structure of the laminated materials.

At first, laminated materials W are prepared by laminating membranes. As schematically shown in FIG. 5, in this embodiment the laminated materials W are formed by laminating a fuel electrode 3, a polymer electrolyte 2, and an air electrode 4, in this order. They are rectangular so as to construct an MEA.

The material for the polymer electrolyte 2 may be, for example, Nafion (a registered trademark), manufactured by DuPont, Fiemion (a registered trademark), manufactured by Asahi Glass, or Aciplex (a registered trademark), manufactured by Asahi Kasei. The material for the fuel electrode 3 may be, for example, a sheet that is made by supporting a platinum catalyst or ruthenium-platinum catalyst on a carbon black carrier such as carbon paper or a carbon non-woven fabric. The material for the air electrode 4 may be, for example, a sheet that is made by supporting a platinum catalyst on a carbon black carrier such as carbon paper or a carbon non-woven fabric.

At the step of disposing the laminated materials W, they are placed in the housing space S of the jig 1 for fixing laminated materials. In the first fixing member 10, the first columnar members 11, 11 are disposed substantially parallel to each other so that the first sheet-shaped member 12 becomes flat. As shown in FIG. 6(A), the laminated materials W are placed in the housing portion 30a that is defined by the sealing member 30 on the first sheet-shaped member 12.

The positioning pin 17 of the first fixing member 10 is inserted through the positioning hole 27 of the second fixing member 20 (see FIG. 3). The second fixing member 20 is guided so that the second sheet-shaped member 22 faces the first sheet-shaped member 12. Thus the second fixing member 20 is placed on the first fixing member 10.

By doing so, the respective ends of the second sheet-shaped member 22, the sealing member 30, and the first sheet-shaped member 12 are clamped by the first columnar member 11 and the second columnar member 21, to be firmly attached to each other. The housing space S is formed by the first sheet-shaped member 12, the second sheet-shaped member 22, and the sealing member 30. The laminated materials W are housed in it.

At the next step of fixing, the housing space S is exhausted by the vacuum pump 42 (see FIG. 7), By doing so, as shown in FIG. 6(B), the first sheet-shaped member 12 and the second sheet-shaped member 22 sandwich the laminated materials W to firmly attach them. Thus the laminated materials W are fixed without any misalignment, deformation, or inclusion of air bubbles in the boundary faces.

Since the second sheet-shaped member 22 is made of resin, it is deformed along the shape of the laminated materials W when the housing space S is exhausted, even if the laminated materials W are thick. Thus it is firmly attached to the laminated materials W to securely fix and hold them.

The jig 1 for fixing laminated materials may be provided at the step of fixing after the vacuum piping 41 that is connected to the vacuum pump 42 is connected to the exhaust port 16. Alternatively, the vacuum piping 41 may be connected to the exhaust port 16 at the step of placing.

At the next step, of pressing, the laminated materials W that are fixed at the step of fixing are pressed to be bonded.

As an example of a pressing device used at the step of pressing, a machine 50 for manufacturing bonded laminated materials is illustrated in FIG. 7. The machine 50 for manufacturing bonded laminated materials is a rolling-pressing device that continuously presses the materials. It comprises hot-pressing rollers 51 for heating and pressing the laminated materials W and cold-pressing rollers 52 that are located at the downstream side of the hot-pressing rollers 51. The cold-pressing rollers 52 cool and press the laminated materials W. FIG. 7 shows that the jig 1 for fixing laminated materials is transported to the hot-pressing rollers 51 and the laminated materials W are pressed. In that figure, the jig 1 for fixing laminated materials is transported from the left to the right. Thus the left side is the upstream side for transportation.

The hot-pressing rollers 51 have a heating device such as an electric heater in them to heat and press the laminated materials W. The cold-pressing rollers 52 have a cooling device such as a piping for a refrigerant to cool and press the laminated materials W.

The machine 50 for manufacturing bonded laminated materials is connected to the vacuum piping 41 via the exhaust port 16, it comprises the vacuum pump 42 as an exhaust device for exhausting the housing space S. The vacuum piping 41 is flexible, so that it can follow the jig 1 for fixing laminated materials that is transported.

A vacuum gauge 43 is connected to any of the exhaust ports 16 to gauge the degree of the vacuum in the housing space S.

The machine 50 for manufacturing bonded laminated materials comprises a guiding rail 53 on its frame 54. The guiding rail 53 is used for having the jig 1 mounted on it for fixing laminated materials to transport the jig to the hot-pressing rollers 51 and the cold-pressing rollers 52. Any known device may be used to transport the jig 1 for fixing laminated materials along the guiding rail 53. The guiding rail 53 is disposed outside the hot-pressing rollers 51 and the cold-pressing rollers 52. Thus the hot-pressing rollers 51 and the cold-pressing rollers 52 press only the first sheet-shaped member 12 and the second sheet-shaped member 22.

As discussed above, the machine 50 for manufacturing bonded laminated materials constitutes a system for manufacturing bonded laminated materials. The machine 50 uses the jig 1 for fixing laminated materials. The machine 50 includes a pressing device for pressing and bonding the laminated materials W made of membranes, an exhaust device for exhausting the housing space S of the jig 1 for fixing laminated materials, and a transporting device for transporting to the pressing device the jig 1 for fixing laminated materials.

At the step of pressing, the jig 1 for fixing laminated materials is mounted on the guiding rail 53 to be transported along it toward the hot-pressing rollers 51 while the housing space S is exhausted by the vacuum pump 42. When the jig 1 for fixing laminated materials arrives at the hot-pressing rollers 51, the laminated materials W are heated and pressed by the hot-pressing rollers 51 via the first sheet-shaped member 12 and the second sheet-shaped member 22 while it is transported downstream, as shown in FIG. 6(C). By doing so, the fuel electrode 3, the polymer electrolyte 2, and the air electrode 4 are bonded so as to manufacture the bonded laminated materials, Since the laminated materials W are heated and pressed, the bonding strength can be improved.

Since the first sheet-shaped member 12 is made of a metallic material, it is appropriately strong so as not to twist or wrinkle. Thus the exhaust hole 12a is prevented from being deformed. Further, since it is highly heat-conductive, the heat of the hot-pressing rollers 51 is effectively transferred to the laminated materials W so that they are efficiently heated.

The jig 1 for fixing laminated materials may be mounted on the guiding rail 53 at the step of placing or the step of fixing.

Since in this embodiment the sealing member 30 is formed to have a certain thickness so that no load from the hot-pressing rollers 51 is applied to the sealing member 30, all the force caused by pressing is applied to the laminated materials W so that they are efficiently pressed.

Then, the jig 1 for fixing laminated materials is transported to the cold-pressing rollers 52 so that the laminated materials W are pressed and cooled by the cold-pressing rollers 52 to manufacture the bonded laminated materials. Since the heat of the laminated materials W is effectively transferred via the first sheet-shaped member 12, the laminated materials W are efficiently cooled. By doing so, the time for cooling the bonded laminated materials that have been manufactured can be shortened and the bonded laminated materials can be quickly transferred to the next step. Thus the productivity can be improved.

Assuming that the bonded laminated materials are manufactured for an MEA, by pressing and cooling the laminated materials that have been pressed and bonded by the hot-pressing rollers 51 the strength of the MEA is improved. Thus a fuel cell that is composed of that MEA will have improved performance.

By using the process for manufacturing the bonded laminated materials as discussed above, since any misalignment of the membranes, deformation, and deficiency in bonding at the interface are avoided, the bonded laminated materials can be manufactured at a high yield factor. Further, since the faces in the direction that the jig 1 is to be transported are flat, unlike a conventional frame for fixing to maintain a vacuum, a continuous pressing method, which is suitable for bulk production, can be used, not a batch-type pressing method such as a flat pressing method. Thus bonded laminated materials can be efficiently manufactured.

Another embodiment of the machine for manufacturing bonded laminated materials is illustrated in FIG. 8. In the figure, the jig 1 for fixing laminated materials is transported from the right side to the left. side. Thus the right side is the upstream side in the direction of the transportation. The machine 50 for manufacturing bonded laminated materials comprises a preheating portion 55 that is located at the upstream side of the hot-pressing rollers 51 in the direction to transport the jig 1 for fixing laminated materials and that preliminarily heats the jig 1 for fixing laminated materials and the laminated materials W. It also comprises a portion for removing residual heat 56 that is located at the downstream side of the hot-pressing rollers 51 in the direction to transport the jig 1 for fixing laminated materials and that cools the jig 1 for fixing laminated materials and the laminated materials W.

At the step of pressing by the machine 50 for manufacturing bonded laminated materials, the jig 1 for fixing laminated materials is mounted on the guiding rail 53 to be transported along it toward the hot-pressing rollers 51 while the housing space S is exhausted by the vacuum pump 42. The jig 1 for fixing laminated materials and the laminated materials W are transported to the hot-pressing rollers 51 after they are preliminarily heated at a predetermined temperature by an electric resistance furnace at the preheating portion 55. After the jig 1 for fixing laminated materials is pressed by the hot-pressing rollers 51, it is transported to the portion 56 for removing residual heat to be cooled by an air cooling fan. By doing so, heating and cooling can be definitely and quickly performed to improve the productivity.

By using the structure having the preheating portion 55, the laminated materials W are prevented from being pressed when insufficient heat is transferred from the hot-pressing rollers 51 to the jig 1 for fixing laminated materials or the laminated materials W, or, for example where the period for having the jig 1 for fixing laminated materials contact the pressing device is short. This may occur when the pressing device is a thermal rolling-pressing device. Especially when the jig 1 for fixing laminated materials is quickly pressed for bulk production, this structure is preferably used to sufficiently heat it.

Figure 9:
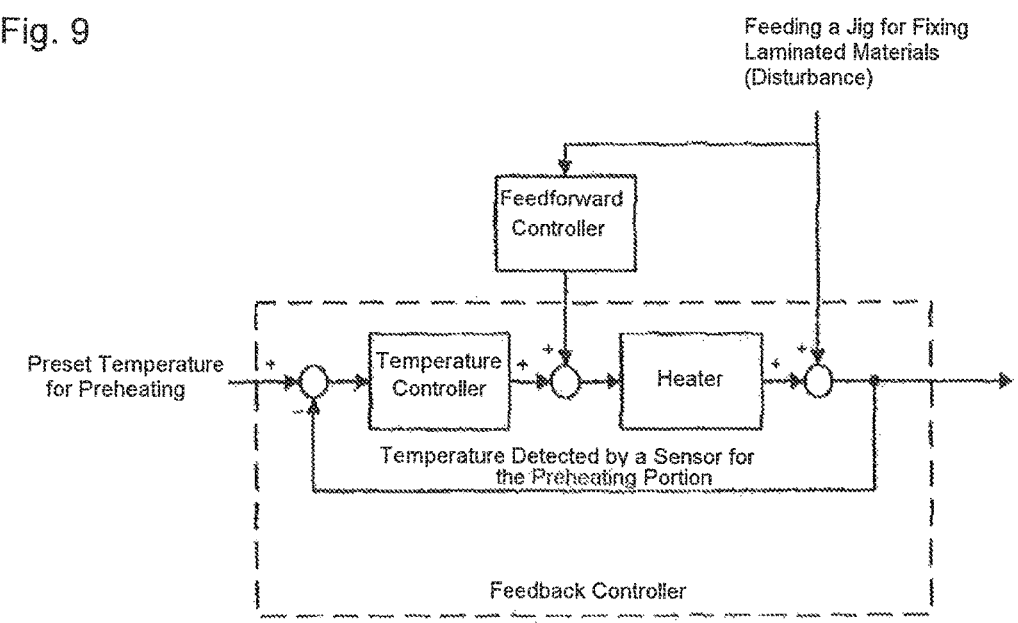
FIG. 9 illustrates a procedure for controlling the temperature of a preheating portion.

For controlling the temperature of the preheating portion 55, a control system that utilizes both a feedforward controller and a feedback controller, as shown in FIG. 9, is preferably used. If a series of the jig 1 for fixing laminated materials are fed to the preheating portion one after another in short cycles, the temperature of the preheating portion 55 would decrease because the heat energy would be transferred to the series of the jig 1. That is, feeding the series of the jig 1 would disturb the preheating portion 55. The correction in the feedforward controller is determined by at least one of the heat capacity of the laminated materials W and the jig 1 for fixing laminated materials, the temperatures of the laminated materials W and the jig 1 for fixing laminated materials before preheating, the temperatures of the laminated materials W and the jig 1 for fixing laminated materials after being heated, a period for the jig 1 for fixing the laminated materials to be preheated by the preheating portion 55, and a time interval for the jig 1 for fixing the laminated materials to be fed to the preheating portion 55. Since the occurrence of a disturbance is preliminarily found so as to determine the amount of correction before it occurs, the feedforward controller is used. Since the feedforward controller carries out corrections to cancel the effects caused by a disturbance that may disturb the control before a change in the temperature that is caused by the disturbance is detected, the effects by a disturbance are generally prevented, and no large effect is generated. Thus if the series of the jig 1 for fixing laminated materials is fed to the preheating portion 55 one after another in short cycles, the temperature of the preheating portion 55 can be stably maintained so as to preliminarily heat the series of the jig 1 in a short period. Thus a system for manufacturing bonded and laminated materials at a high quality and a large quantity can be provided.

If the system includes the portion 56 for removing residual heat, the productivity is improved, since the time for cooling the bonded laminated materials that have been manufactured is shortened so as to quickly feed them to the next step. Since the jig 1 for fixing laminated materials is prevented from being taker. out when the laminated materials W have not been sufficiently cooled because of the large heat capacity of the jigs 1 for fixing laminated materials, etc., the safety is improved. For example, the operator is prevented from being burned.

The preheating portion 55 utilizes not only an electric resistance furnace but also various heating means, such as a furnace using heat rays such as infrared rays, a furnace using electromagnetic waves, and a device for heating an object by contacting it with a heating plate.

The portion 56 for removing residual heat utilizes not only an air cooling fan but also various cooling means, such as a water cooling fan, a device for cooling an object by contacting it with a plate that is cooled by water, and a device for contacting an object by a conveyor that is cooled by water.

For manufacturing an MEA as the bonded laminated materials, the forces to generate pressures to be applied to the laminated materials W by the hot-pressing rollers 51 and the cold-pressing rollers 52 are preferably a force of 0.7-2.0 MPa when pressing by plates. If the forces to generate pressures are too low, the bonding strength in the MEA may be insufficient. If they are too high, the MEA may be damaged.

The temperature for heating by the hot-pressing rollers 51 and the preheating portion 55 is preferably at the temperature to heat the inside of the laminated materials at 100-140° C. when they are pressed. If the temperature for heating is too high, the MEA may be damaged by the heat. If the temperature is too low, the bonding strength in the MEA may be insufficient, so that the performance of a fuel cell that is constructed by using the MEA deteriorates.

The temperature to be cooled by the cold-pressing rollers 52 and the portion for removing residual heat 56 is preferably at the temperature to cool the inside of the laminated materials at 20-40° C. when they are pressed. If the laminated materials are not sufficiently cooled, they are taken out of the machine for manufacturing bonded laminated materials when they have no sufficient strength. If they are fed to the next step without. having a sufficient strength, the MEA may be deformed at the next step so that the performance of a fuel cell that is constructed by using the MEA deteriorates, It they are cooled to too low a temperature, the productivity may decrease, since the cooling time becomes longer.

In this embodiment, the first sheet-shaped member 12 is made of metal and the second sheet-shaped member 22 is made of resin material. However, the materials and their combinations are not limited to this structure.

A sheet made of fiber-reinforced rubber that is dispersion-reinforced by whiskers of glass or ceramics, or a rubberized cloth that is integrated with a foundation cloth and a thin rubber sheet that is laminated on each side of the foundation cloth, may be used for the second sheet-shaped member 22.

A rubberized sheet that has both rigidity and flexibility is preferably used for the second sheet-shaped member 22. For a foundation cloth for the rubberized cloth, a woven fabric made of fluorine-type fibers, polyimide fibers, polyphenylene sulfide fibers, aramid fibers, nylon fibers, polyester fibers, polyamide fibers, polyurethane fibers, or cotton fibers, or a sheet made of glass fibers, etc., may be used.

For a thin rubber sheet, fluorine-containing rubber, nitrile rubber, polyurethane rubber, chloroprene rubber, natural rubber, silicon rubber, etc. are used. A surfactant agent such as tri(alkoxy alkyl)phosphate or an antistatic agent such as carbon may be added to these kinds of rubber.

If heat resistance is needed for the second sheet-shaped member 22, for example, if the jig 1 for fixing laminated materials is used at a high temperature (for example, at 160° C.), for example, glass fibers, heat-resistant synthetic fibers, etc., are preferably used for the foundation cloth and fluorine-containing rubbers, silicon rubbers, etc., are preferably used for the rubber. The heat-resistant synthetic fiber is a fiber that is used at the temperature that is used for the jig 1 for fixing laminated materials to seal the housing space S. A glass fiber, a heat-resistant nylon fiber, etc., is used for it.

If the fiber-reinforced rubber sheet is used for the second sheet-shaped member 22, any misalignment of the laminated materials W or a leakage from the vacuum in the housing space S can be prevented, both of which are caused by the differences between the thermal expansions of the second sheet-shaped member 22 and other elements, since the thermal expansion of the fiber-reinforced rubber sheet is small. Further, since it is elastic and flexible, when it is deformed by an applied force the shape of it returns to the original one after removing the force. It does not deform even when a force is being repeatedly applied to it. Thus any deformation that follows the shape of the exhausting portion 30b does not cause the exhaust flow path to be occluded. Since it has a high shock-absorbing property so as to maintain the uniform pressure, uniformly pressing the laminated materials W by rollers can be carried out without causing a localized pressure on them. Since it is durable, no rupture is caused by any corner of the laminated materials W or the jig. Further, since it is highly adhesive so as to have a good sealing property, the degree of the vacuum in the housing space S is improved.

A material that is harder than the laminated materials W, for example, a metal or a hard resin that is flexible, may be used for the sealing member 30. The sealing member 30 is designed to have a thickness so that only a load that would not substantially deform the sealing member 30 is applied to it when the laminated materials W are pressed. By doing so, the thickness of the laminated materials W is maintained to be that of the sealing member 30. Thus bonded laminated materials that have a constant thickness can be manufactured.

Figure 10:
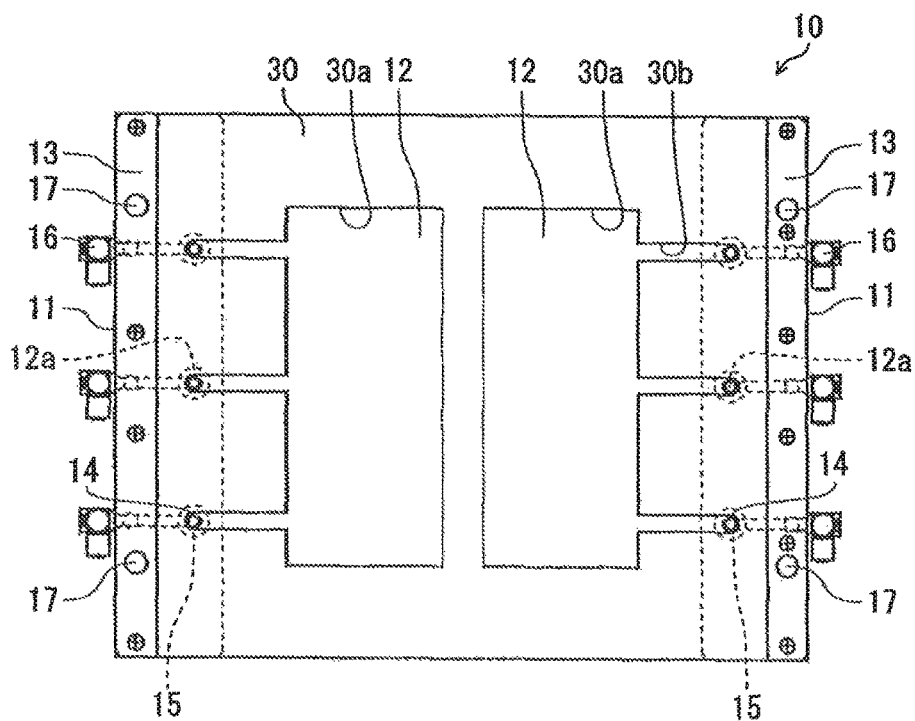
FIG. 10 is a plan view showing a variation of the sealing member.

The arrangement of the housing portion 30a and the exhausting portion 30b in the sealing member 30 is not limited to the embodiment that is discussed above. It may be arbitrarily designed based on the arrangement of the pressing device. As shown in FIG. 10, for example, the housing portion 30a may be arranged so that the housing spaces S are placed in parallel in the width-direction. The exhausting portion 30b may be formed to be directed toward the outside in the width-direction of the first sheet-shaped member 12. A plurality of the housing portions 30a may be provided in the direction to transport the jig 1 for fixing laminated materials.

Within the exhausting portion 30b, a spacer may be provided that prevents the exhaust hole 12a from being occluded when the housing space S is exhausted by the vacuum pump 42. The spacer is constructed so that air passes through it. As shown in FIG. 11(A) for example, a spacer 60 that is made of a porous material or steel wool that has a sufficient aeration property may be used. Alternatively, as shown in FIG. 11(B), a spacer 61 that has multiple extrusions that surround the exhaust hole 12a may be used. By using the spacer, the second sheet-shaped member 22 is prevented from being sucked into the exhausting portion 30b when the housing space S is exhausted. Thus the exhaust hole 12a is prevented from being occluded by the second sheet-shaped member 22, which would cause the housing space S to be insufficiently exhausted.

FIG. 7 shows the machine 50 for manufacturing bonded laminated materials that has a set of hot-pressing rollers 51 and a set of cold-pressing rollers 52, for the pressing devices. However, the machine is not limited to that structure. The existence or non-existence of hot-pressing rollers or cold-pressing rollers and the number of rollers may be arbitrarily selected based on the bonded laminated materials to be manufactured.

In this embodiment, the rolling-pressing device that presses by means of multiple rollers is used for a pressing device. However, it is not limited to that structure. Various kinds of pressing devices, such as a double-belt-type pressing device, may be used.

Effects of First Embodiment

By using the jig 1 for fixing laminated materials, the system for manufacturing bonded laminated materials, and the method for manufacturing the bonded laminated materials of this embodiment, the laminated materials W that are made of membrane materials are housed in the housing space S that is formed by the first sheet-shaped member 12, the second sheet-shaped member 22, and the sealing member 30. The housing space S is exhausted by the vacuum pump 42 via the exhaust passage 14 and the exhaust hole 12a so that the laminated materials W the housing space S are firmly sandwiched by the first sheet-shaped member 12 and the second sheet-shaped member 22, to be transported while they are fixed by them. The laminated materials W are pressed and bonded by the hot-pressing rollers 51 and the cold-pressing rollers 52 of the machine 50 for manufacturing bonded laminated materials to manufacture the bonded laminated materials. Thus, since the laminated materials W that are made by laminating membranes are pressed and bonded while they are firmly fixed by exhausting the housing space S, the bonded laminated materials are manufactured at a good yield factor without any misalignment of the membranes or any deficiency in bonding at the interface. Further, unlike a conventional fixing frame for maintaining a vacuum, since the faces hi the direction to be transported are flat, a continuous pressing method, which is suitable for bulk production, can be used, not a batch-type pressing method such as a flat pressing method. Thus bonded laminated materials can be efficiently manufactured.

[Second Embodiment]

With reference to the drawings, the second embodiment of the jig for fixing laminated materials of the present invention is discussed. The components that are the same as those in the first embodiment are denoted by the same numerals. So a duplicate description is omitted.

Figure 13:
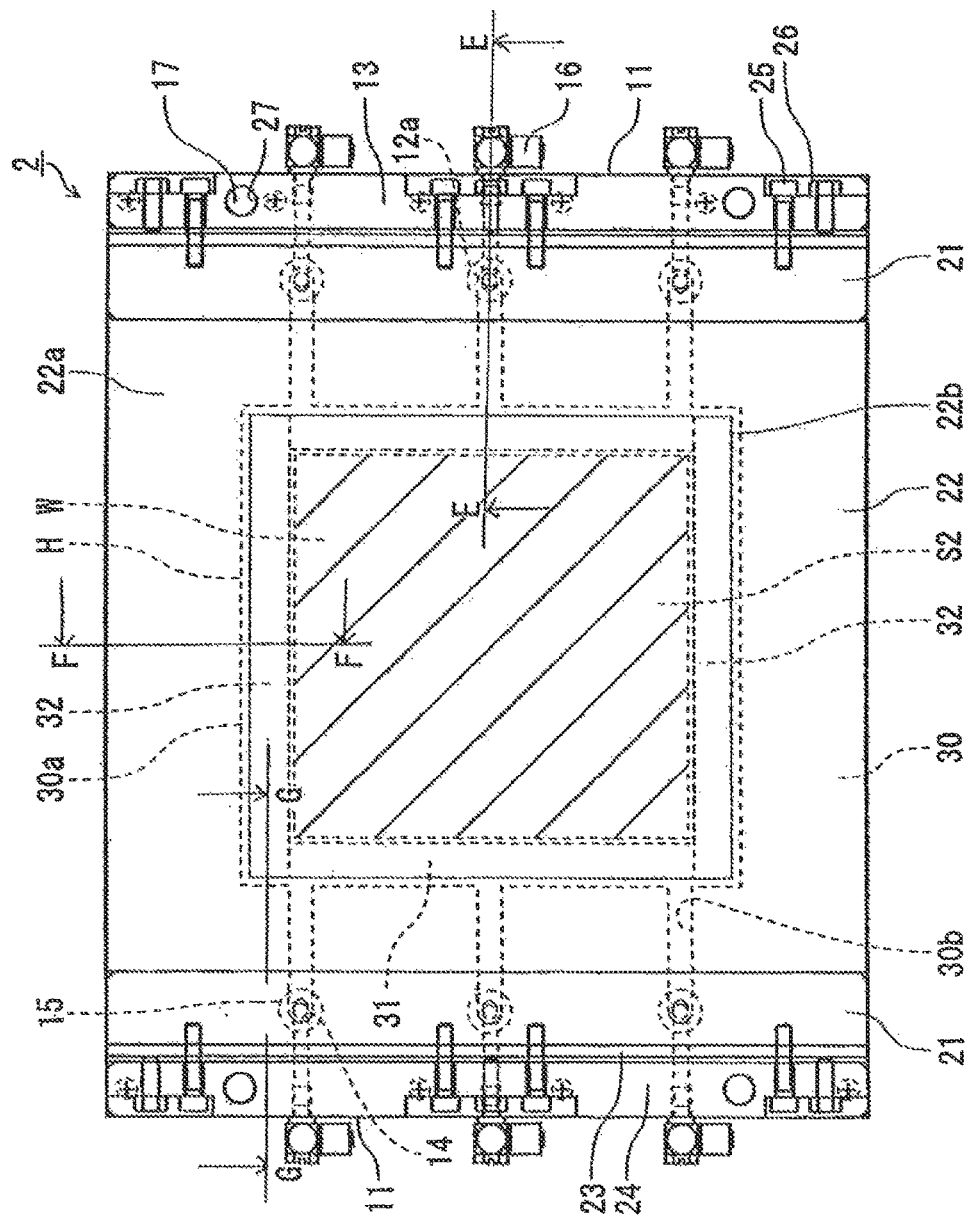
FIG. 13 is a plan view showing the laminated materials that are placed in the jig for fixing the laminated materials of the second embodiment.

As shown in FIGS. 12, 13, and 14, the jig 2 for fixing the laminated materials of this embodiment has a member 31 for forming the housing space that is formed in the shape of a rectangular frame in the housing portion 30a of the first sheet-shaped member 12. In this embodiment, the member 31 for forming the housing space is made of stainless steel, which is a metal, at a thickness that is less than that of the laminated materials W. It is caused to adhere to the first sheet-shaped member 12 by a heat-resistant adhesive.

The member 31 for forming the housing space divides the housing portion 30a into the housing space S2 and the flow space H while it is sandwiched by the first sheet-shaped member 12 and the second sheet-shaped member 22. The housing space S2 positions the laminated materials W in the member 31 for forming the housing space. The flow space H is fluidly connected to the exhausting portion 30b around the outer circumference of the member 31 for forming the housing space, to exhaust the housing space S2. Thus the laminated materials W can be accurately positioned in the housing space S2. Further, since the flow space H for exhausting is secured, the exhausting passage is not occluded due to any possible misalignment of the laminated materials W, etc., so that the housing space S2 is securely exhausted.

Though FIG. 12(A) shows the member 31 for forming the housing space that is formed as a rectangle, its shape may be arbitrarily determined based on the shape of the laminated materials W.

On the upper face of the member 31 for forming the housing space, a member 32 for adjusting the thickness is provided to increase the thickness of a portion of the member 31 for forming the housing space. The member 32 for adjusting the thickness is provided at least on the side in the downstream side in the direction to transport the jig 2 for fixing laminated materials to the machine 50 for manufacturing bonded laminated materials. In this embodiment, it is provided at two of the four sides of the member 31 for forming the housing space that is formed as rectangle. The two sides are perpendicular to the direction to transport the jig 2 for fixing laminated materials. The member 32 for adjusting the thickness is formed so that it is almost the same shape as the side of the member 31 for forming the housing space and so that the sum of the thickness of it plus the thickness of the member 31 for forming the housing space is equal to, or thicker than, that of the laminated materials W.

The second sheet-shaped member 22 is formed by sticking a flexible sheet 22a to and integrating it with a member 22b for adding stiffness. The flexible sheet 22a is made of Teflon (a registered trademark), which is reinforced by glass fibers that are made of flexible resin. The Teflon is processed to give it an antistatic characteristic. The member 22b for adding stiffness is stiffer than the flexible sheet 22a and is formed as a rectangular plate that is made of a flexible material.

When the first fixing member 10 and the second fixing member 20 are combined, the member 22b for adding stiffness is formed to be a size larger than the laminated materials W, but not to exceed the size of the member 31 for forming the housing space to be placed at the position to press the laminated materials W from the other side of the laminated materials W via the flexible sheet 22a. Since the member 22b for adding stiffness is formed at that size, the laminated materials W are securely fixed and uniformly pressed. Further, since the second sheet-shaped member 22 is firmly attached to the sealing member 30, the housing space S2 is securely sealed. In this embodiment, the second sheet-shaped member 22 is formed to be almost the same shape as the shape of the member 31 for forming the housing space. The member 22b for adding stiffness may be used in the first embodiment. In this case, it is formed to be larger than the laminated materials W and smaller than the housing space S.

As material for forming the member 31 for forming the housing space and the member 32 for adjusting the thickness, metal, especially stainless steel, is preferably used. Since stainless steel is cheaper than heat-resistant rubber and easily machined, the cost for manufacturing the jig for fixing laminated materials is reduced. Further, since metal is durable and heat-resistant, it can be repeatedly used for a long time. It can also be preferably used when the laminated materials are pressed and bonded while it is heated to a high temperature. In this embodiment, for the same reasons, stainless steel is used for the sealing member 30.

Next, a method for manufacturing bonded laminated materials is described, The same explanation as that of the first embodiment is omitted.

Figure 15:
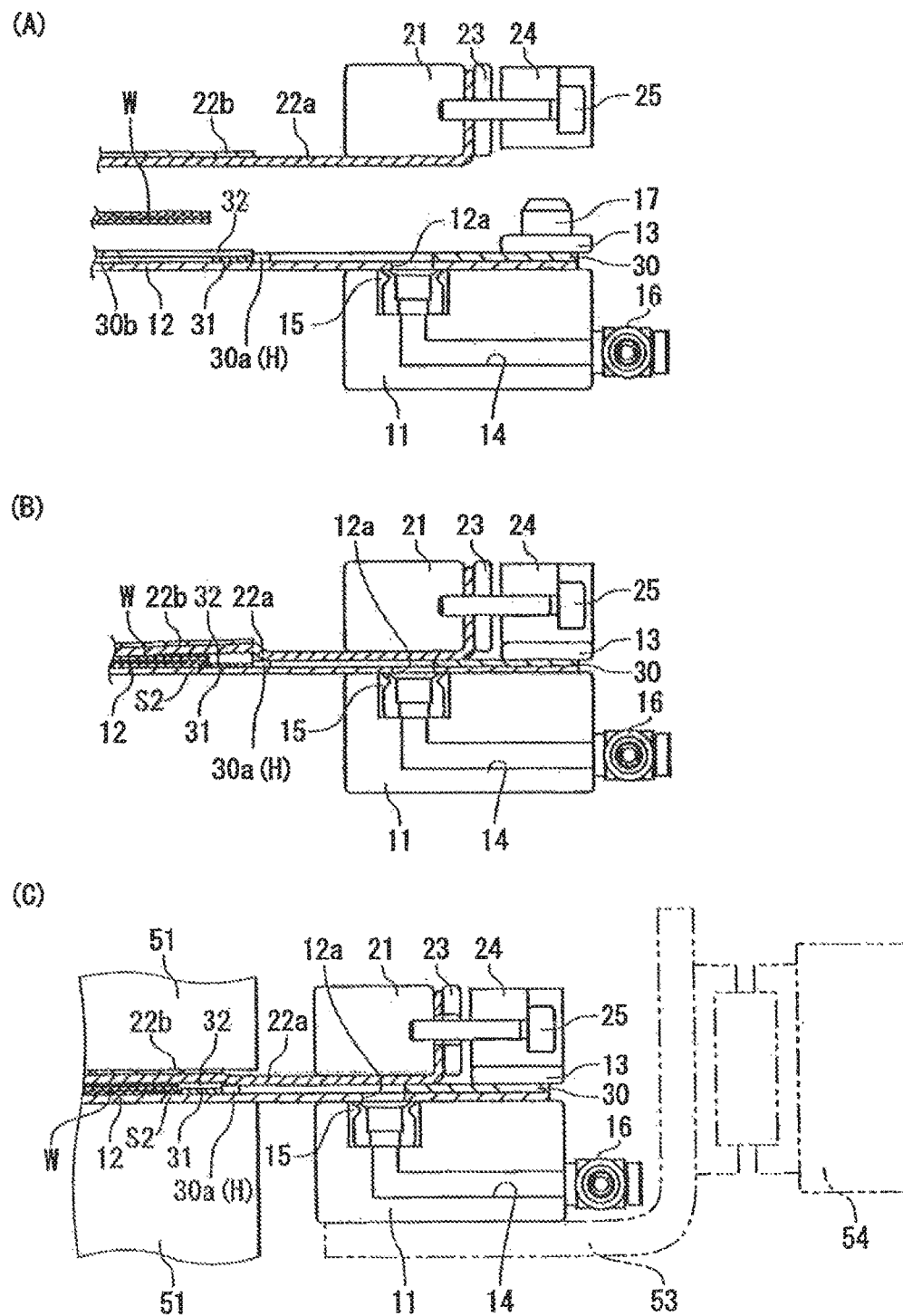
FIG. 15 illustrates the procedure for manufacturing the bonded laminated materials by the second embodiment.

As shown in FIG. 15(A), in the step of placing the laminated materials W, they are placed within the member 31 for forming the housing space on the first sheet-shaped member 12. The second fixing member 20 is placed on the first fixing member 10. Thus the housing space 52 is formed by the first sheet-shaped member 12, the second sheet-shaped member 22, and the member 31 for forming the housing space, so that the laminated materials W are housed in it.

In the next step, the step of fixing, the housing space S2 is exhausted by the vacuum pump 42 (see FIG. 7) through the flow space H. As shown in FIG. 15(B), the first sheet-shaped member 12 and the second sheet-shaped member 22 firmly sandwich the laminated materials W, to fix them. The end portion of the member 22b for adding stiffness that is a part of the second sheet-shaped member 22 is supported by the member 32 for adjusting the thickness via the flexible sheet 22a. The flexible sheet 22a turns outward toward the laminated materials W to be firmly attached to them.

The housing portion 30a is separated into the housing space S2 and the flow space H by means of the member 31 for forming the housing space. Thus the laminated materials W are accurately positioned within the housing space S2. Further, since the flow space H that is used for exhaustion is secured, the flexible sheet 22a is securely and firmly attached to the sealing member 30. Thus the flow space H and the housing space S2 are sealed. Since a difference between the level of the member 32 for adjusting the thickness and the level of the member 31 for forming the housing space exists, a space is formed between the member 31 for forming the housing space and the second sheet-shaped member 22. Thus the housing space S2 is efficiently exhausted through that space.

In the next step, of pressing, the laminated materials W that have been fixed in the step of fixing are pressed and bonded by the pressing device. As shown in FIG. 15(C), after the jig 2 for fixing laminated materials is transported to the machine 50 for manufacturing the bonded laminated materials, the hot-pressing rollers 51 press the member 32 for adjusting the thickness before pressing the laminated materials W. Since the sum of the thickness of the member 32 for adjusting the thickness plus the thickness of the member 31 for forming the housing space is equal to, or greater than, the thickness of the laminated materials W, the hot-pressing rollers 51 gradually press the laminated materials W via the member 22b for adding stiffness. Thus the end portion of the laminated materials W is prevented from being damaged by any applied and excessive load.

Since a certain stiffness is added to the flexible sheet 22a by means of the member 22b for adding stiffness, the flexible sheet 22a is prevented from entering, and attaching to, a concave of the laminated materials W, which have a concavo-convex surface. Thus, if the material of the laminated materials W can be easily attached to the flexible sheet 22a and is fragile, any damage to the laminated materials W can be avoided. To effectively apply a load on the laminated materials W, the difference between the level of the upper face of the laminated materials W and the level of the upper face of the member 32 for adjusting the thickness is preferably 3 mm or less. If only the convexes of the laminated materials W should be pressed, a second sheet-shaped member 22 that has the member 22b for adding stiffness is preferably used.

The member 31 for forming the housing space may be integrated with the first sheet-shaped member 12, In this case, no misalignment of the housing space S2 or uneven width of the flow space H occurs. The member 31 for forming the housing space may be fixed to the second sheet-shaped member 22.

In this embodiment, the first sheet-shaped member 12 is made of metal and the second sheet-shaped member 22 is made of a material that is made by sticking a flexible resin sheet to a metal sheet. However, the materials and the combination are not limited to them. In this embodiment a sheet made of fiber-reinforced rubber that is dispersion-strengthened by whiskers of glass or ceramics, or a sheet made of fiber-reinforced rubber, such as a rubberized cloth that is integrated with a foundation cloth and a thin rubber sheet that is laminated on both sides of the foundation cloth, which are both described for the first embodiment, may be used for the second sheet-shaped member 22.

In this embodiment, the member 22b for adding stiffness is located on the side that is reverse to that of the laminated materials W, via the flexible sheet 22a. As shown in FIG. 16, the member 22b for adding stiffness may be placed at the side to contact the laminated materials W. By doing so, since the flexible sheet 22a is prevented from contacting the laminated materials W, any damage to the laminated materials W is avoided, if the flexible sheet 22a can be easily attached to the laminated materials W, and if the material of the laminated materials W is fragile.

In this embodiment the second sheet-shaped member 22 is made by sticking the flexible sheet 22a to the member 22b for adding stiffness. An elastic material such as silicon rubber may be placed between the flexible sheet 22a and the member 22b for adding stiffness. In this configuration, since the flexible sheet 22a does not directly contact the member 22b for adding stiffness, any damage to the flexible sheet 22a caused by the end or corner of the member 22b for adding stiffness is avoided. Thus the flexible sheet 22a is prevented from being damaged. Further, since the pressing force is distributed to be applied to the laminated materials W by using the elastic material as a buffer material, the laminated materials W are more uniformly pressed. The member 22b for adding stiffness may be used for the jig for fixing the laminated materials of the first embodiment, which embodiment does not use the member 31 for forming the housing space.

A spacer that enables an airflow to pass through the flow space H and the housing space S2 when they are exhausted by the vacuum pump 42 may be placed in the housing portion 30a. In this configuration the second sheet-shaped member 22 is prevented from being sucked into the exhausting portion 30b when the flow space H and the housing space S2 are exhausted. Thus the exhaust hole 12a is prevented from being occluded by the second sheet-shaped member 22, which would cause the housing space S2 to be insufficiently exhausted.

The member 31 for forming the housing space may be formed by a spacer that enables an airflow to go through the spacer. For example, a spacer made of porous material or steel wool that has a sufficient aeration property or a spacer that has multiple concaves and convexes may be used. In this configuration, when exhausting the flow space H and the housing space S2, the housing space S2 is efficiently exhausted to the flow space H by using the spacer. Thus the housing space S2 is sufficiently exhausted.

In so far as the member 31 for forming the housing space is formed in a frame-like shape, it may be formed in various shapes, such as a frame having an opening at a portion or a frame made of segments.

Effects of Second Embodiment

By using the jig 2 for fixing laminated materials, the system for manufacturing bonded laminated materials, and the method for manufacturing the bonded laminated materials, of this embodiment, the same advantageous effects as those of the first embodiment can be achieved. Further, the jig 2 for fixing laminated materials comprises the member 31 for forming the housing space and the member 32 for adjusting the thickness in the first sheet-shaped member 12 that is divided into the housing space S2 and the flow space H by the member 31 for forming the housing space. Thus the laminated materials W are accurately positioned in the housing space S2. The flow space H for exhaustion is also securely maintained. Since the flexible sheet 22a is securely and firmly attached to the sealing member 30, the flow space H and the housing space S2 are sealed. Since a difference in level between the member 32 for adjusting the thickness and the adjoining member 31 for forming the housing space exists, a space is formed between the member 31 for forming the housing space and the second sheet-shaped member 22. Thus the housing space S2 is efficiently exhausted through that space. Since the sum of the thickness of the member 32 for adjusting thickness plus the member 31 for forming the housing space is equal to, or larger than, the thickness of the laminated materials W, the hot-pressing rollers 51 gradually press the laminated materials W via the member for adding stiffness 22b. Thus an excessive load is prevented from being applied to an end portion of the laminated materials W, so as not to damage the laminated materials W. Further, the second sheet-shaped member 22 has the member 22b for adding stiffness to add a certain, stiffness to the flexible sheet 22a. Thus the flexible sheet 22a is prevented from being sucked into the laminated materials W, which have a concavo-convex shape. Any damage to the laminated materials W is avoided even when the material of the laminated materials W can easily stick to the flexible sheet 22a, or the material is fragile. By making the size of the member 22b for adding a stiffness equal to, or greater than, the size of the laminated materials W, but not larger than the member 31 for forming the housing space, the laminated materials W are securely fixed and uniformly pressed. Since the second sheet-shaped member 22 is firmly attached to the sealing member 30, the housing space S2 is securely sealed.

[Other Embodiments]

Figure 17:
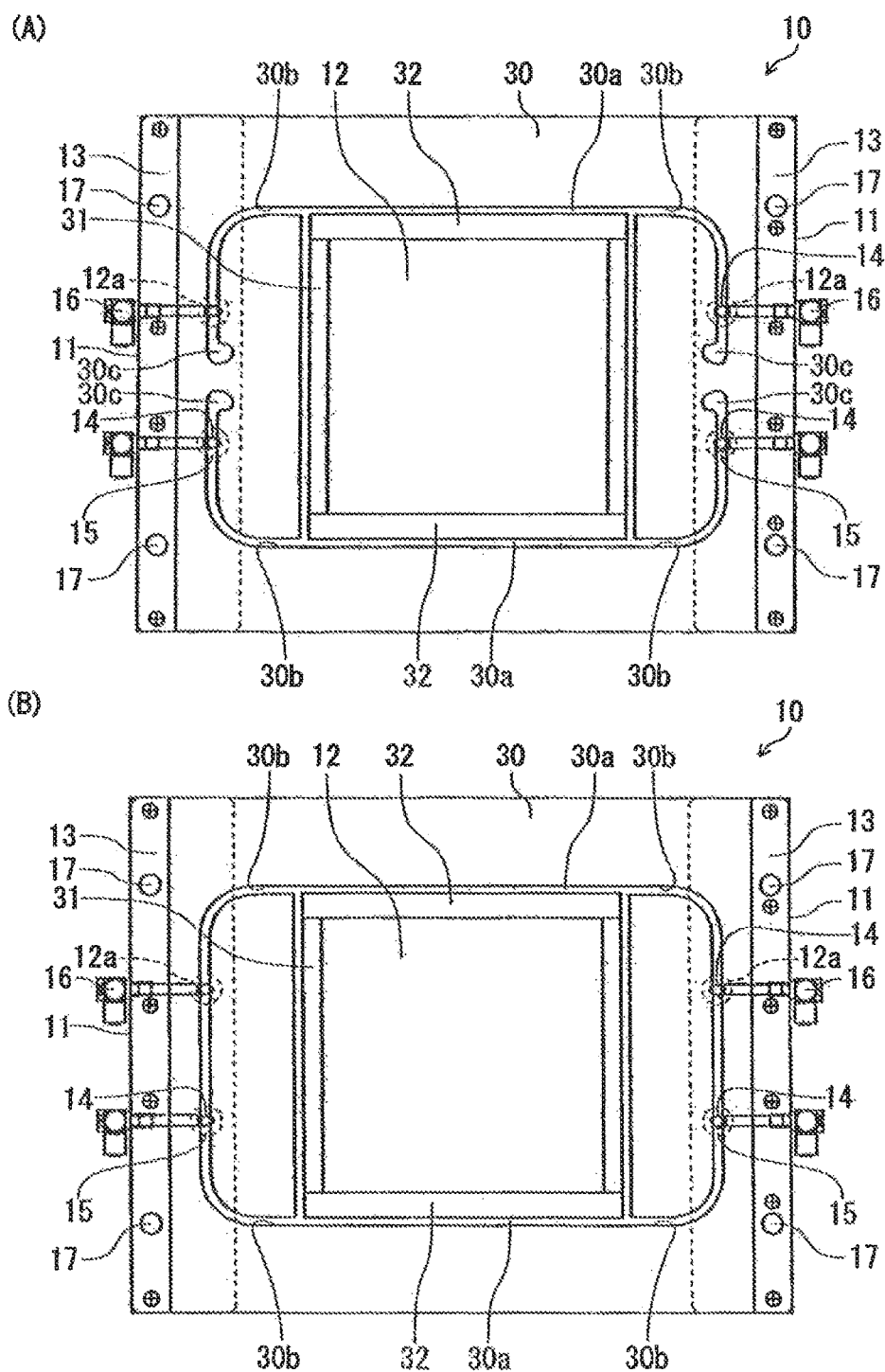
FIG. 17 is a plan view showing a variation of the exhausting portion.

With reference to FIG. 17, a variation of the exhausting portion 30b is described. In the configuration shown in FIG. 17(A), at the end portion of the exhausting portion 30b that is not connected to the housing portion 30a (a housing space), a portion 30c for smoothing the deformation is formed. The portion 30c for smoothing the deformation has a large width compared to the exhausting portion 30b. Its outer periphery is curved to be smoothly connected to the exhausting portion 30b, and has no corner. The exhaust hole 12a is disposed at the exhausting portion 30b. Since the portion 30c for smoothing the deformation is shaped as discussed above, the second sheet-shaped member 22 does not bend in a small area at the end portion of the exhausting portion 30b. Thus any wrinkle that can interrupt the exhaustion is avoided. The area of the portion 30c for smoothing the deformation is larger than that of the exhausting portion 30b. If the exhaust hole 12a is disposed at the portion 30c for smoothing the deformation, the second sheet-shaped member 22 may be sucked into it, so that then the hole 12a is occluded. Since the exhaust hole 12a is disposed along the exhaust passage of the exhausting portion 30b, any occlusion at the exhaust hole 12a is avoided. In this embodiment, the exhausting portion 30b extends from the end of the housing portion 30a to gently curve at a right angle. Thus since no large deformation of the second sheet-shaped member 22 in a small area at the connection of the housing portion 30a and the exhausting portion 30b or the bending of the exhausting portion 30b is generated, that configuration is more preferable. The exhausting portion 30b is not necessarily curved at a right angle. The portion 30c for smoothing the deformation may be provided at the end portion of the exhausting portion 30b that extends in a straight line from the end of the housing portion 30a.

In the configuration shown in FIG. 17(B), the exhausting portion 30b is formed as a loop, wherein both ends of it are connected to the housing portion 30a. The exhaust hole 12a is provided along the fluid path in the loop. In this embodiment, one end of the exhausting portion 30b is connected to the end portion of the housing portion 30a and another end is connected to another end portion of the housing portion 30a. The exhausting portion 30b gently curves as a loop, and has no corner. Since no portion of the second sheet-shaped member 22 is greatly deformed in a small area in the exhausting portion 30b, the exhausting from the housing space is not obstructed.

These configurations in FIG. 17 may be used for the jig for fixing laminated materials of the first and second embodiments.

Figure 18:
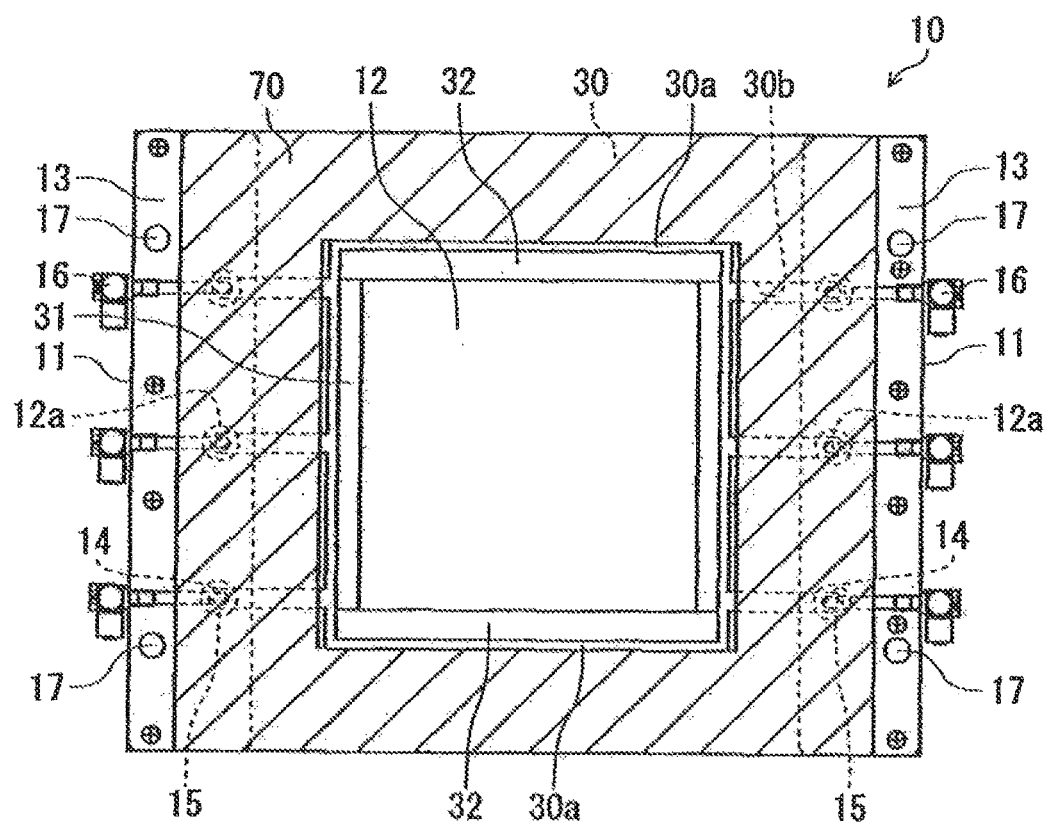
FIG. 18 is a plan view showing the structure of the cover for the flow path.
Figure 19:
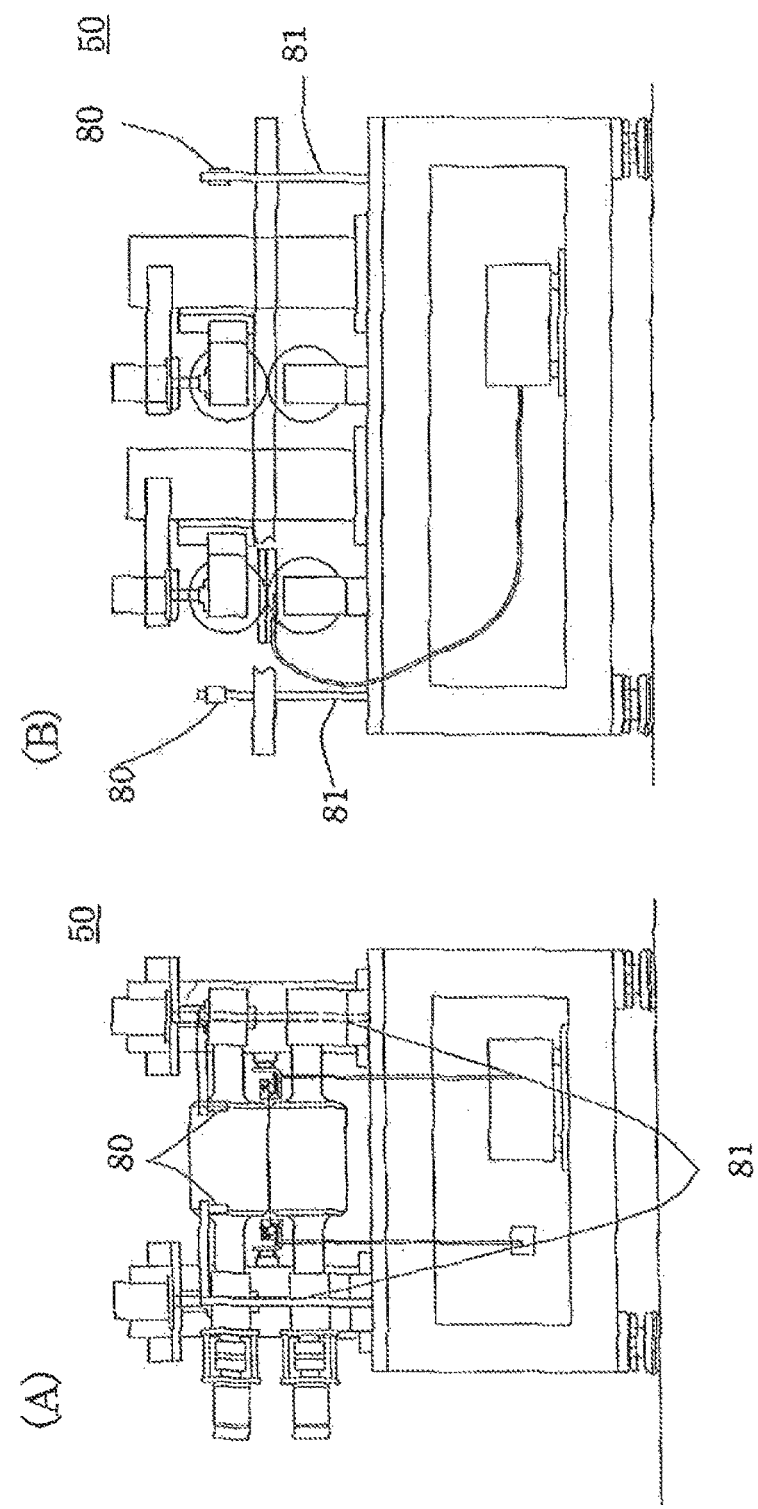
FIG. 19 illustrates a schematic structure of a variation of a method for measuring the degree of a vacuum in the machine for manufacturing bonded laminated materials.
Figure 20:
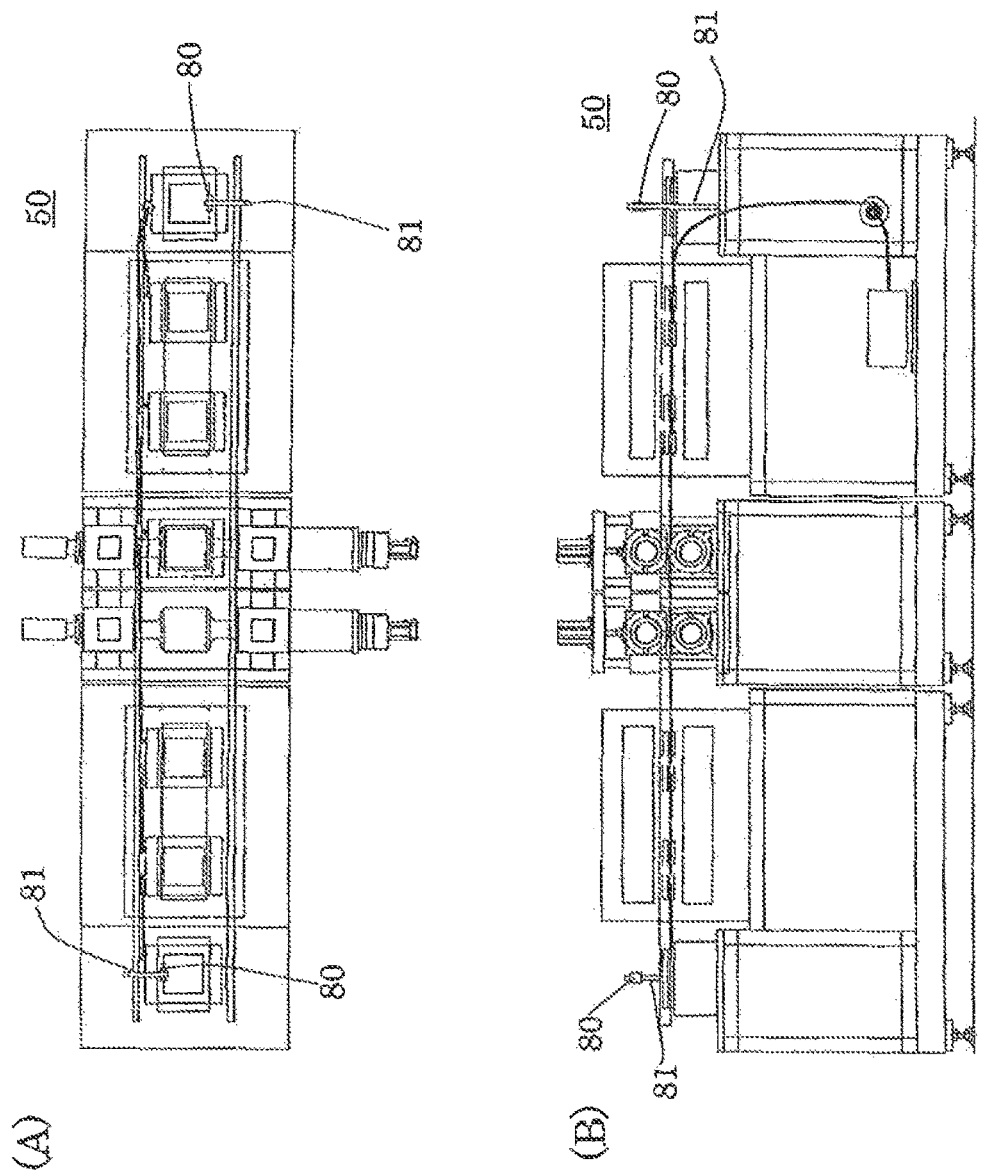
FIG. 20 schematically illustrates a structure of a variation of a method for measuring the degree of a vacuum in the machine for manufacturing bonded laminated materials.
Figure 21:
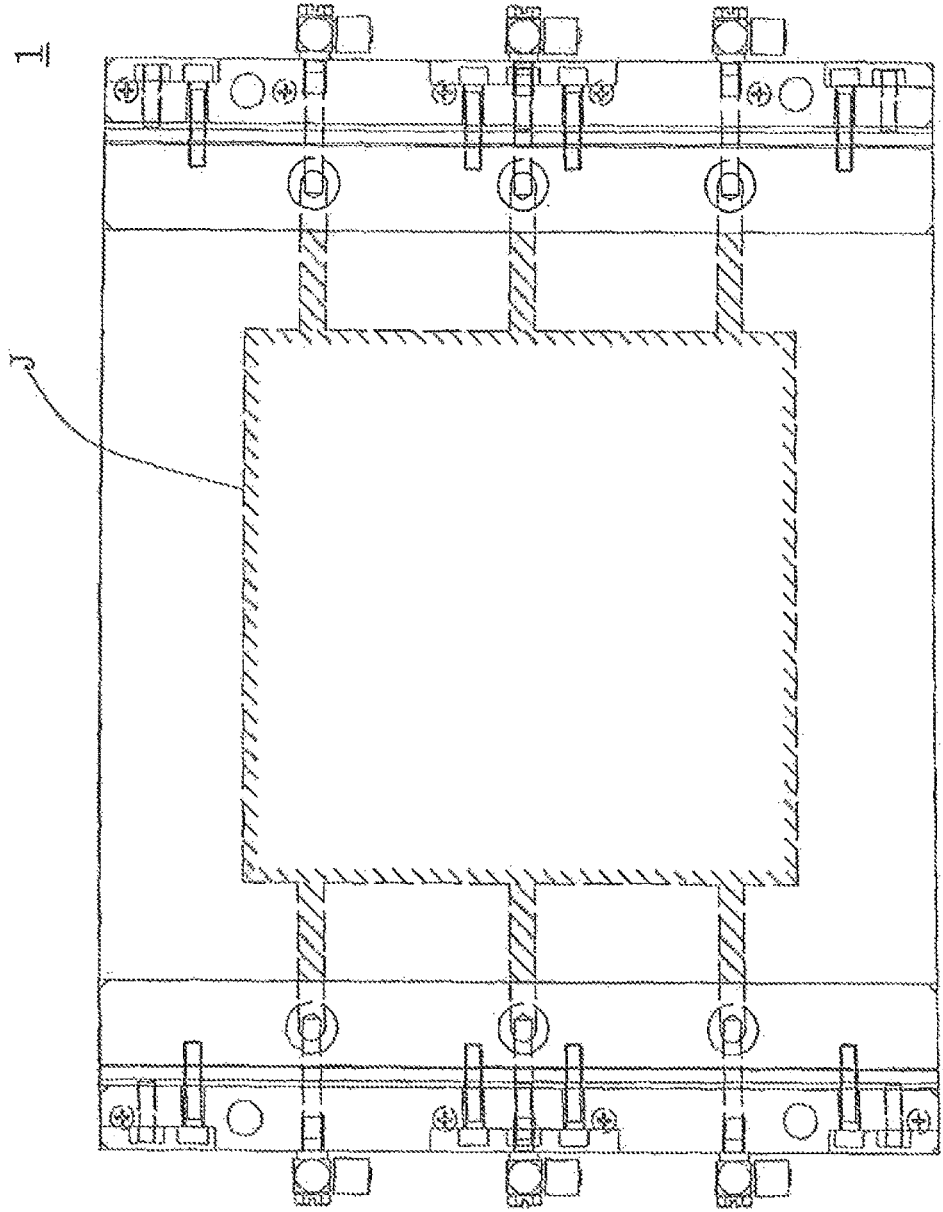
FIG. 21 is a plan view illustrating a portion for measuring a displacement of the jig for fixing the laminated materials in FIG. 1.
Figure 22:
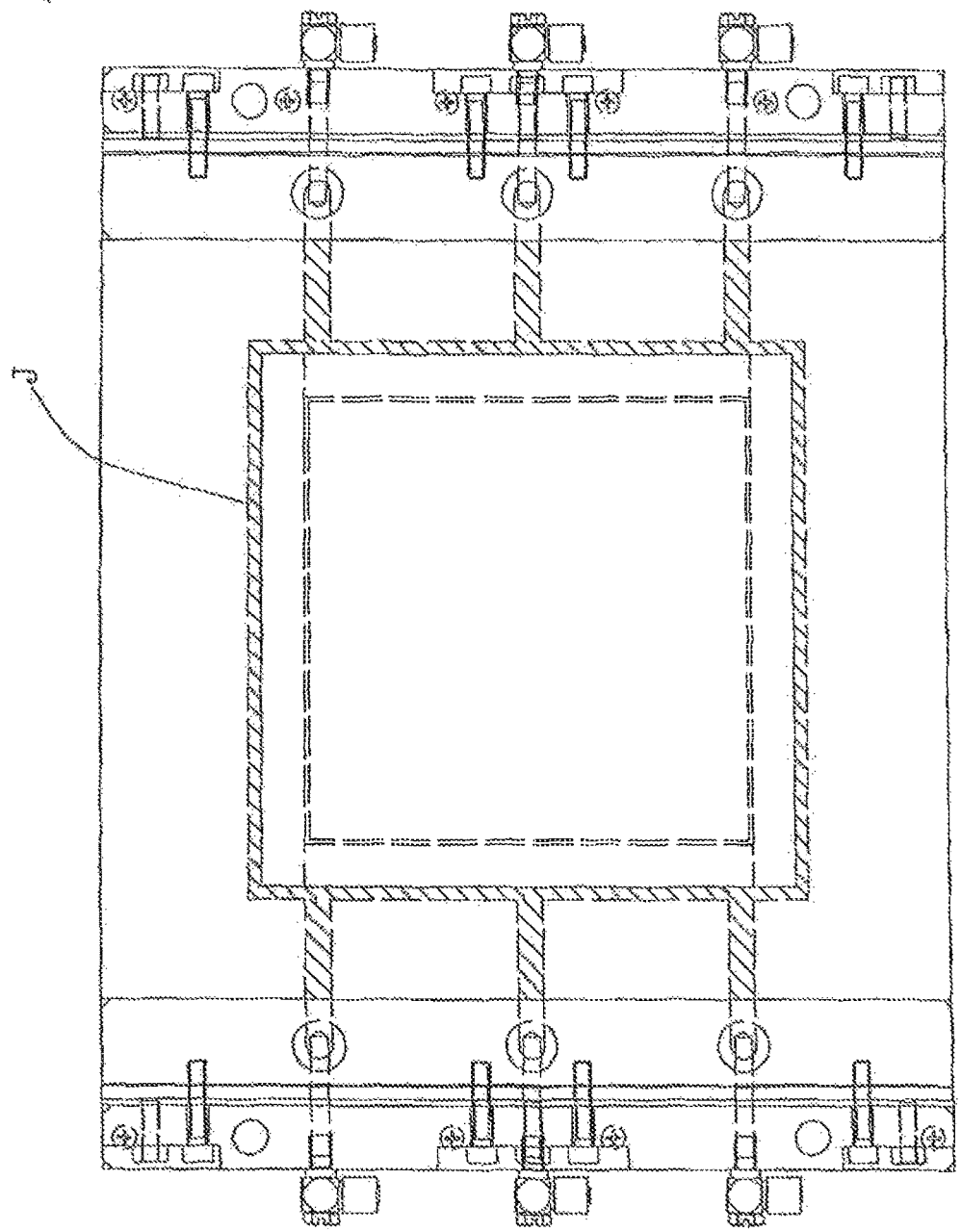
FIG. 22 is a plan view illustrating a portion for measuring a displacement of the jig for fixing the laminated materials in FIG. 12.

With reference to FIG. 18, a cover for the flow path that prevents the exhausting portion from being occluded by the second sheet-shaped member is now described. The cover 70 for the flow path covers at least a portion of the exhausting portion 30b. It has a rectangular opening that is formed to expose the housing portion 30a. It is a rectangular plate. By using it, the second sheet-shaped member 22 is prevented from being sucked into the exhausting portion 30b when the housing space S is exhausted. Thus the exhaust hole 12a is prevented from being occluded by the second sheet-shaped member 22, and exhausting from the housing space S is not Obstructed. The cover 70 for the flow path may be integrated with the sealing member 30, for example, by adhering by means of a heat-resistant adhesive agent. In this configuration, since no gap is formed between the sealing member 30 and the cover 70 for the flow path, exhausting the housing space S is not obstructed by a leak. The shape of the cover 70 for the flow path is not limited to that in FIG. 18. In so far as it prevents the exhausting portion 30b from being obstructed by the second sheet-shaped member 22, the area of it to cover the exhausting portion 30b may vary. It may be constructed by blocks. The cover 70 for the flow path may be used for the jig for fixing the laminated materials of the first and second embodiments.

With reference to FIGS. 19 to 22, variations of the method for measuring a vacuum in the housing space are described.

The machine 50 for manufacturing bonded laminated materials comprises a laser displacement meter 80 and a device 81 for fixing the laser displacement meter 80 to the machine for manufacturing bonded laminated materials. The laser displacement meter 80 is provided to measure a distance to at least a point of a portion J for measuring a displacement in the second sheet-shaped member 22 of the jig 1 for fixing laminated materials or the jig 2 for fixing laminated, materials when the jig 1 or the jig 2 is fed to the machine 50 for manufacturing bonded laminated materials or taken out from the machine 50. The portion J for measuring a displacement corresponds to a portion of the second sheet-shaped member 22, which portion is the housing space S that is to be made a vacuum, the exhausting portion 30b, or the flow space H, is formed. If the housing space S of the jig 1 for fixing laminated materials or the jig 2 for fixing laminated materials is decompressed, the distance of the portion J for measuring a displacement from the laser displacement meter 80 becomes longer, since the portion J for measuring a displacement is sucked toward the first sheet-shaped member 12. By measuring that distance, it can be checked if the housing space S has become a vacuum. Since the housing space S can be checked to see if it has become a vacuum when the jig 1 or the jig 2 is fed to the machine 50, transporting the jig 1 or the jig 2 starts after the housing space is checked to see if it has become a vacuum. Since the housing space S can be checked to see if it has become a vacuum when the jig 1 or the jig 2 is taken out from the machine 50, the jig 1 or the jig 2 can be thereafter taken out. By using the laser displacement meter 80, the degree of the vacuum is easily measured. Thus no piping to connect to the vacuum gauge 43 is needed unless a strict measurement of the degree of a vacuum is required. Thus the structure of the machine can be simplified.

WORKING EXAMPLE

Working Example 1

In this example, an MEA for a solid polymer fuel cell is manufactured by using the jig for fixing laminated materials of the first embodiment and the machine for manufacturing bonded laminated materials, as in FIG. 6. The present invention is not limited to the following working examples.

The polymer electrolyte that constitutes the MEA is a square sheet 200 mm long and 200 mm wide that is cut from a sheet 50 μm thick. The fuel electrode and the air electrode are square sheets 190 mm long and 190 mm wide that are cut from a sheet 400 μm thick. The polymer electrolyte is a sheet made of Nafion (a registered trademark), supplied by DuPont. The fuel electrode and the air electrode are sheets made by having carbon paper support platinum catalysts.

A stainless steel sheet 300 μm thick that is polished to a mirror finish on both sides is used for the first sheet-shaped member. A sheet made of Teflon (a registered trademark) 300 μm thick is used for the second. sheet-shaped member. A silicon rubber sheet 400 μm thick is used for the sealing member. It is caused to adhere to the first sheet-shaped member by using a heat-resistant adhesive agent. The sealing member is cut out to have a housing portion that is a square 210 mm long and 210 mm wide and an exhausting portion that is a rectangle 30 mm long and 10 mm wide.

By laminating the fuel electrode, the polymer electrolyte, and the air electrode, in this order, the laminated materials are prepared. The laminated materials are placed in the housing portion on the first fixing jig. Then the second fixing jig is placed on the first fixing jig.

After the housing space is exhausted so that the laminated materials are fixed in the housing space by the first sheet-shaped member and. the second sheet-shaped member, they are heated and pressed by the hot-pressing rollers, to be bonded. The pressure in the housing space is depressurized to 3.5 kPa at an absolute pressure. The pressing force is set at 2.0 MPa when an equivalent force is calculated from the pressure on a plane. The temperature of the rollers is adjusted to have the temperature of the laminated materials be 130° C. while they are being pressed.

Next, the laminated materials that have been pressed and bonded by the hot-pressing rollers are cooled and pressed by the cold-pressing rollers. The pressure in the housing space is maintained at 3.5 kPa at an absolute pressure by being depressurized by a vacuum pump following the hot-pressing. The pressing force is applied at 2.0 MPa when an equivalent force is calculated from the pressure on a plane. The temperature of the rollers is adjusted to have the temperature of the laminated materials just after pressing be about 40° C.

The laminated materials are bonded by these processes. Thus the MEA for a solid polymer fuel cell is manufactured.

Working Example 2

In this example, an MEA for a solid polymer fuel cell is manufactured by using the jig for fixing laminated materials of the second embodiment and the machine for manufacturing bonded laminated materials in FIG. 7.

A stainless steel sheet 300 μm thick that is polished to a mirror finish on both sides is used for the first sheet-shaped member. A sheet made by a flexible sheet made of Teflon (a registered trademark) 130 μm thick that is processed for an antistatic treatment and includes a glass cloth is used for the second sheet-shaped member. The second sheet-shaped member is made by sticking the flexible sheet to a stainless steel sheet 300 μm thick that is polished to a mirror finish on both sides. A stainless steel sheet 350 μm thick is used for the member for forming the housing space. It is caused to adhere to the first sheet-shaped member by a heat-resistant adhesive agent. The member for forming the housing space is cut out to have the outer shape of a square 230 mm long and 230 mm wide and the second housing space of a square 210 mm long and 210 mm wide. A stainless steel sheet 500 μm thick is used for the member for adjusting the thickness. The member for adjusting the thickness is caused to adhere to the member for forming the housing space at two points by a heat-resistant adhesive agent. The member for adjusting the thickness is formed to be a rectangle 10 mm long and 230 mm wide. A stainless steel sheet 500 μm thick is used for the sealing member. The sealing member is caused to adhere to the first sheet-shaped member by a heat-resistant adhesive agent. The sealing member is cut out to have a housing portion that is a square 236 mm long and 236 mm wide and an exhausting portion that is a rectangle 30 mm long and 3 mm wide. They are positioned to have the width of the flow space be 3 mm.

By laminating the fuel electrode, the polymer electrolyte, and the air electrode, in this order, the laminated materials are prepared. The laminated materials are placed in the housing portion on the first fixing jig. Then the second fixing jig is placed on the first fixing jig.

After the second housing space is exhausted so that the laminated materials are fixed in the second housing space by the first sheet-shaped member and the second sheet-shaped member, they are preheated by the preheating portion. Then they are heated and pressed by the hot-pressing rollers, to be bonded. The pressure in the second housing space is depressurized to 3.5 kPa absolute pressure. The pressing force is applied at 2.0 MPa when an equivalent force is calculated from the pressure on a plane. The temperature of the rollers is adjusted to have the temperature of the laminated materials be 130° C. while it is being pressed.

Next, the laminated materials that have been pressed and bonded by the hot-pressing rollers are cooled by the portion for removing residual heat. The pressure in the second housing space is maintained at 3.5 kPa absolute pressure by being depressurized by a vacuum pump following the hot-pressing. The temperature is adjusted to have the temperature of the laminated materials be about 40° C.

The laminated materials are bonded by these processes. Thus the MEA for a solid polymer fuel cell is manufactured.

The jig for fixing laminated materials, the system for manufacturing bonded laminated materials, and the method for manufacturing bonded laminated materials, of the present invention, can be used to manufacture bonded laminated materials other than an MEA.

Manufacturing an IC Card

For example, an IC card can be manufactured by using the jig for fixing laminated materials, the system for manufacturing bonded laminated materials, and the method for manufacturing bonded laminated materials of the present invention. A layer of the thermoplastic adhesive agent is provided between two sheets. An inlet that has an IC chip, an antenna, etc., mounted on it is encapsulated in the layer of a thermoplastic adhesive agent. A work that includes the layer of the thermoplastic adhesive agent wherein the inlet is encapsulated between the two sheets is placed on the jig for fixing laminated materials.

The inside of the jig for fixing laminated materials is depressurized. The work is preheated together with the jig for fixing laminated materials so that the layer of the thermoplastic adhesive agent is softened. When it is softened, the inside of the jig for fixing laminated materials is maintained to be a vacuum so that the work is sandwiched by the first sheet-shaped member and the second sheet-shaped member, to be firmly attached and fixed. Thus the inlet is not misaligned.

The work with the jig for fixing laminated materials is heated and pressed by a continuous pressing machine (a hot press), such as a roll press or a double-belt press. During this process, the inside of the jig for fixing laminated materials is maintained to be a vacuum so that the work is fixed. Thus the inlet is not misaligned.

The work with the jig for fixing laminated materials is cooled so that the thermoplastic adhesive agent is hardened. In this process the work with the jig may be cooled and pressed by a continuous pressing machine (a cold press). During this process, the inside of the jig for fixing laminated materials is maintained to be a vacuum so that the work is fixed. Thus the inlet is not misaligned. The vacuum inside the jig is discontinued so that the work can be taken out of the jig.

By using the jig for fixing laminated materials, the system for manufacturing bonded laminated materials, and the method for manufacturing bonded laminated materials of the present invention, any misalignment of the inlet inside the bonded laminated materials is easily avoided. Further, since a continuous pressing machine can be used, the productivity is improved.

Manufacturing a Lithium-Ion Battery

For example, a lithium-ion battery can be manufactured by using the jig for fixing laminated materials, the system for manufacturing bonded laminated materials, and the method for manufacturing bonded laminated materials, of the present invention. Slurry that includes an active material is prepared by distributing the active material in a solvent that contains a lithium-ion conducting binder. Slurry that includes a solid electrolyte is prepared by distributing a sulfide-system solid electrolyte in a solvent that contains a lithium-ion conducting binder. The sheets made of the slurry that includes an active material and the slurry that includes a solid electrolyte are formed on a substrate by the doctor blade method. They are heated and dried, and then exfoliated. Thus a sheet of the active material and a sheet of the solid electrolyte are made. The sheets of the slurry that includes an active material and the slurry that includes a solid electrolyte may be formed by a method other than the doctor blade method. The active material sheet and the solid electrolyte sheet are cut so as to be mounted on the jig for fixing laminated materials. The two solid electrolyte sheets that have been cut are sandwiched by the two active material sheets that have been cut. The two active material sheets that have been cut are sandwiched by two charge-collector sheets so that a work is formed. The work is placed on the jig for fixing laminated materials.

The inside of the jig for fixing laminated materials is depressurized. The work with the jig for fixing laminated materials is preheated to the temperature that is equal to, or over, the melting point of the lithium-ion conducting binder. If the lithium-ion conducting binder is preheated to that temperature, the inside of the jig for fixing laminated materials is maintained to be a vacuum so that the work is sandwiched by the first sheet-shaped member and the second sheet-shaped member, to be firmly attached and fixed. Thus the laminated materials are not misaligned. This preheating process may be omitted.

The work with the jig for fixing laminated materials is heated to that temperature and pressed by a continuous pressing machine (a hot press), such as a roll press and a double-belt press. During this process, the inside of the jig for fixing laminated materials is maintained to be a vacuum, so that the work is fixed. Thus the laminated materials are not misaligned.

The work with the jig for fixing laminated materials is cooled. In this process the work with the jig may be cooled and pressed by a continuous pressing machine (a cold press). During this process, the inside of the jig for fixing laminated materials is maintained to be a vacuum so that the work is fixed. Thus the laminated materials are not misaligned. The vacuum inside the jig is discontinued, so that the work can be taken out of the jig.

By using the jig for fixing laminated materials, the system for manufacturing bonded laminated materials, and the method for manufacturing bonded laminated materials, of the present invention, any misalignment of the laminated materials is easily avoided. Further, since a continuous pressing machine can be used, the productivity is improved.

Manufacturing a Secondary Battery

For example, a secondary battery that includes a layer of a solid electrolyte, a layer of an active material, and a layer of a charge collector, can be manufactured by using the jig for fixing laminated materials, the system for manufacturing bonded laminated materials, and the method for manufacturing bonded laminated materials, of the present invention. The secondary battery is made by alternately laminating positive electrodes and negative electrodes via separators and then putting them in a case, The positive and negative electrodes are formed by attaching a layer of electrode-active material to a sheet of a charge collector. The method of manufacturing the secondary battery is characterized in that the layer of the electrode-active material is formed by applying a paste made of a binder that includes a powdered active material and crystalline resin to the sheet, heating and pressing that sheet under a vacuum by a depressurized pressing method that uses the jig for fixing laminated materials, and crystallizing the crystalline resin. A paste that includes a powdered active material and crystalline resin is applied to the surface of a charge-collector sheet and is then dried. The charge-collector sheet to which a layer of the active material is applied is put on the jig for fixing laminated materials, as a work.

The inside of the jig for fixing laminated materials is depressurized. The work with the jig for fixing laminated materials is preheated to a temperature that is equal to, or over, the melting point of the binder. If the binder is preheated to that temperature, the inside of the jig for fixing laminated materials is maintained to be a vacuum so that the work is sandwiched by the first sheet-shaped member and the second sheet-shaped member, to be firmly attached and fixed. Thus the layer of the active material is not removed from the charge collector. This preheating process may be omitted.

The work with the jig for fixing laminated materials is heated to that temperature and pressed by a continuous pressing machine (a hot press), such as a roll press or a double-belt press. During this process, the inside of the jig for fixing laminated materials is maintained to be a vacuum, so that the work is fixed. Thus the layer of the active material is not removed from the charge collector.

The work with the jig for fixing laminated materials is slowly cooled. In this process the work with the jig may be cooled and pressed by a continuous pressing machine (a cold press). During this process, the inside of the jig for fixing laminated materials is maintained to be a vacuum so that the work is fixed. Thus the layer of the active material is not removed from the charge collector. The vacuum inside the jig is discontinued so that the work can be taken out of the jig.

By repeating these processes, at least a pair of the positive electrode and the negative electrode (the charge collector and the active material) are manufactured. The positive and the negative electrodes are laminated via a separator. Two of the separators, which are a pair, are bonded on their circumferences to form a bag. Respective portions for drawing electricity are inserted into at least one slit of the respective positive and negative electrodes of the charge-collector block, to electrically connect them. An insulating layer is formed on the portions of the positive and negative blocks for charge collectors that exclude the insides of the slits. Electrical connections between the positive and negative blocks for charge collectors and the portions for drawing electricity are made by swaging or laser welding.

By using the jig for fixing laminated materials, the system for manufacturing bonded laminated materials, and the method for manufacturing bonded laminated materials, of the present invention, removing the layer of the active material from the charge collector is easily avoided. Further, since a continuous pressing machine can be used, the productivity is improved.

Manufacturing a Dye-Sensitized Solar Cell

For example, a dye-sensitized solar cell can be manufactured by using the jig for fixing laminated materials, the system for manufacturing bonded laminated materials, and the method for manufacturing bonded laminated materials, of the present invention. The dye-sensitized solar cell generally has a laminated structure that comprises a working electrode (a negative electrode), a counter electrode (a positive electrode), a photosensitized dye that is supported by the working electrode, a sealing portion that connects the working electrode to the counter electrode, and an electrolyte layer that is disposed in a space sealed by the working electrode, the counter electrode, and the sealing portion. The negative electrode is generally made by fixing fine powders such as titanium dioxide (an n-type oxide semiconductor) on the surface of a transparent glass or plastic sheet that has a transparent conducting layer of indium tin compounds on its surface, and having a photosensitive dye, such as one made from ruthenium compounds, be absorbed by the fine powders. The positive electrode is generally made of platinum, carbon, or conductive glass. The electrolyte is made of iodine compounds, bromine compounds, or complex compounds of cobalt. It operates to receive electrons from the positive electrode, to reduce the amount of oxidized dyes. Photosensitive dyes are generally dyes of ruthenium compounds.

Fine powders such as titanium dioxide (an n-type oxide semiconductor) are fixed on the working electrode. Photosensitive dyes such as those of the ruthenium compounds are absorbed by the powders. A sealing material made of thermoplastic resin is applied to either or both of the working electrode (negative electrode) and the counter electrode (positive electrode). A work that is made by laminating the working electrode and the counter electrode in the way such that the surface to which the sealing material is applied is inside, is placed on the jig for fixing laminated materials.

The inside of the jig for fixing laminated materials is depressurized. The work with the jig for fixing laminated materials is pressed by a continuous pressing machine, such as a roll press or a double-belt press. During this process, the inside of the jig for fixing laminated materials is maintained to be a vacuum so that the work is fixed. Thus the working electrode and the counter electrode are not misaligned. Since they are pressed, the space surrounded by the working electrode, the counter electrode, and the sealing material, is sealed. The electrolyte is poured into the sealed space to form the electrolyte layer.

By using the jig for fixing laminated materials, the system for manufacturing bonded laminated materials, and the method for manufacturing bonded laminated materials of the present invention, any misalignment of the working electrode and the counter electrode is avoided. Further, inclusion of air in the space that is surrounded by the working electrode, the counter electrode, and the sealing material, is easily avoided. Thus, a dye-sensitized solar cell that has improved efficiency in power generation is manufactured.

Manufacturing an Organic EL Panel

An organic EL denotes a so called OLED (Organic Light Emitting Diode) or an OEL (Organic Electro Luminescence). The structure of the organic EL element is generally made by laminating an anode electrode, a hole-injecting layer, a hole transport layer, an emitting layer, an electron-transport layer, an electron-injection layer, and a cathode electrode, in this order. The structure of an organic EL panel that incorporates an organic EL element is made by forming an electrode (generally, a translucent positive electrode to be formed by a material such as ITO) on a translucent supporting substrate (a glass substrate or a plastic substrate), forming an emitting layer on it, forming a counter electrode (generally, an opaque negative electrode to be formed by metal) on it, and forming a sealing layer on it.

The organic EL panel, which is a self-luminous panel, comprises a layer of the supporting substrate, a layer of the first electrode that is adjacent to the layer of the supporting substrate, an emitting layer that is adjacent to the layer of the first electrode, a layer of the second electrode that is adjacent to the emitting layer, and a sealing layer that is adjacent to the layer of the second electrode. The method of manufacturing the organic EL panel of the present invention comprises the step of housing in a housing portion of a jig for fixing laminated materials laminated materials that have a layer of a supporting substrate, a layer of the first electrode that is adjacent to the layer of the supporting substrate, an emitting layer that is adjacent to the layer of the first electrode, a layer of the second electrode that is adjacent to the emitting layer, and a sealing layer that is adjacent to the layer of the second electrode, the step of depressurizing the housing portion, and the step of sealing the emitting layer by means of an adhesive agent for sealing, which emitting layer is sandwiched by the layer of the supporting substrate and the sealing layer by way of pressing the laminated materials with the jig for fixing laminated materials by means of a pressing device. The method is characterized in that it has the step of heating the laminated materials with the jig for fixing laminated materials by a heating means and the step of cooling the laminated materials with the jig for fixing the laminated materials by a cooling means.

Specifically, after a film of translucent ITO (tin-doped indium oxide) is formed on a translucent supporting substrate such as a glass substrate or plastic substrate by a spattering method, etc., a positive electrode is formed by patterning. A hole-injecting layer and a hole transport layer are formed, An emitting layer is formed by a vacuum evaporation method, a spin coating method, a printing method, a transfer method, a mask evaporation method, inkjet printing method, etc. An electron-transport layer and an electron-injection layer are formed. A negative electrode is formed by an evaporation method by using a metal such as Al. An adhesive agent for sealing is applied to the sealing substrate that forms a sealing layer. The sealing layer is constructed of the sealing substrate. The materials for the sealing substrate may be glass such as soda glass, lead glass, and hard glass, plastics such as polyethylene, polypropylene, polyethylene terephthalate, and polymethylmethacrylate, and a metal such as aluminum and stainless steel. A thermosetting epoxy adhesive agent may be used for the sealing adhesive agent. The translucent supporting substrate and sealing substrate are piled up by disposing the emitting layer and the side on which the sealing adhesive agent is applied inside, respectively, to be a work. The work is placed on the jig for fixing laminated materials.

The inside of the jig for fixing laminated materials is depressurized. The work with the jig for fixing laminated materials is preheated. If it is preheated, the work is sandwiched by the first sheet-shaped member and the second sheet-shaped member to be firmly attached and fixed, since the inside of the jig for fixing laminated materials is maintained to be a vacuum. Thus the laminated materials are not misaligned. Further, no water or air enters it. This preheating process may be omitted.

The work for fixing laminated materials is heated to the temperature that is at or above the curing temperature of the adhesive agent for sealing and pressed by a continuous pressing machine (a hot press). During this process, the inside of the jig for fixing laminated materials is maintained to be a vacuum so that the laminated materials are not misaligned. Further, it is sealed so that no air or water exists in the emitting layer.

The work with the jig for fixing laminated materials is cooled. In this process the work with the jig may be cooled and pressed by a continuous pressing machine (a cold press). During this process, the inside of the jig for fixing laminated materials is maintained to be a vacuum so that the work is fixed. Thus the laminated materials are not misaligned. The vacuum inside the jig is broken off so that the work is taken out of the jig.

By using the jig for fixing laminated materials, the system for manufacturing bonded laminated materials, and the method for manufacturing bonded laminated materials of the present invention, any misalignment of the laminated materials is easily avoided. Further, it is sealed so that no air or water exists in the emitting layer.

Manufacturing an MEA, an IC card, a lithium-ion battery, a secondary battery, a dye-sensitized solar cell, and an organic EL panel, by using the jig for fixing laminated materials, the system for manufacturing the bonded laminated materials, and the method for manufacturing the bonded laminated materials of the present invention, is described. However, these are just examples for the methods of manufacturing products. The jig for fixing laminated materials, the system for manufacturing the bonded laminated materials, and the method for manufacturing the bonded laminated materials, of the present invention, can be used for manufacturing other products.

Below the numerals and symbols used in the detailed description and the drawings are listed.

1. a jig for fixing laminated materials
2. a jig for fixing laminated materials
10. a first fixing member
11. a first columnar member
12. a first sheet-shaped member
12a. an exhaust hole
13. a first stopper
14. an exhaust passage
15. a vacuum pad
16. an exhaust port
17. a positioning pin
20. a second fixing member
21. a second columnar member
21a. a lower face
21b. an inclined portion
21c. a rounded portion
21d. an even portion
22. a second sheet-shaped member
22a. a flexible sheet
22b. a member for adding stiffness
23. a retainer plate
24. a second stopper
25. a fixing screw
26. an adjusting screw
27. a positioning hole
30. a sealing member
30a. a housing portion
30b. an exhausting portion
30c. a portion for smoothing the deformation
31. a member for forming the housing space
32. a member for adjusting a thickness
41. a vacuum piping
42. a vacuum pump (an exhaust device)
43. a vacuum gauge
50. a machine for manufacturing bonded laminated materials
51. hot-pressing rollers (a pressing device)
52. cold-pressing rollers (a pressing device)
53. a guiding rail
54. a frame
55. a preheating portion
56. a portion for removing residual heat
60, 61. a spacer 70. a cover for the flow path
80. a laser displacement meter
81. a device for fixing the laser displacement meter
S. a housing space
S2. a housing space (a second housing space)
W. laminated materials
H. a flow space
J. a portion for measuring a displacement

The invention claimed is:

1. A jig for fixing laminated materials that is used for manufacturing bonded laminated materials by pressing and bonding materials made of membranes by means of a pressing device, comprising:
 a first fixing member having a pair of first columnar members that are disposed substantially in parallel to a direction the jig is to be transported to the pressing device and a first sheet-shaped member that is stretched between the pair of first columnar members by anchoring ends to respective faces of said first columnar members that extend in a longitudinal direction of the pair of first columnar members;
 a second fixing member having a pair of second columnar members that face respective first columnar members and a second sheet-shaped member that is stretched between the pair of second columnar members by anchoring ends to respective faces of said second columnar members that extend in the longitudinal direction of the pair of second columnar members;
 a sealing member that is disposed between the first sheet-shaped member and the second sheet-shaped member that are positioned by the pair of first columnar members and the pair of second columnar members, respectively, to face each other, the sealing member defining a housing space between the first sheet-shaped member and the second sheet-shaped member, a housing space being divided into a housing portion to house the laminated materials and an exhaust portion that exhausts the housing portion;
 wherein a face of the jig for fixing laminated materials in the direction the jig is to be transported is flat;
 wherein an exhaust passage is formed in at least one of the pair of the first columnar members to fluidly communicate with the housing space through an exhaust hole that penetrates the first sheet-shaped member and the exhaust passage is connected to an exhaust device; and
 wherein, when the laminated materials are located in the housing space and the housing space is exhausted by the exhaust device, the first sheet-shaped member and the second sheet-shaped member sandwich the laminated materials in the housing space to press the laminated materials that are transported to the pressing device while the laminated materials are fixed.

2. The jig for fixing the laminated materials of claim 1, further comprising:
 a member for forming the housing space that is a frame-shaped plate that is located between the first sheet-shaped member and the second sheet-shaped member that are arranged to face each other by the pair of first columnar members and the pair of second columnar members;
 wherein the member for forming the housing space is formed to be thinner than the laminated materials, the member separating the housing space into a second housing space for housing the laminated materials and a flow space around the second housing space, the flow space being fluidly connected to the exhaust hole.

3. The jig for fixing the laminated materials of claim 2, wherein the member for forming the housing space has a member for adjusting a thickness of a part of the member for forming the housing space that increases the thickness of the part, and wherein the member for adjusting the thickness is configured to have a total thickness of the member for adjusting the thickness plus the member for forming the housing space be greater than a thickness of the laminated materials.

4. The jig for fixing the laminated materials of claim 1, wherein the first sheet-shaped member is made of metal.

5. The jig for fixing the laminated materials of claim 1, wherein the second sheet-shaped member is made of resin material that is flexible.

6. The jig for fixing the laminated materials of claim 1, wherein the second sheet-shaped member is made of fiber-reinforced rubber.

7. The jig for fixing the laminated materials of claim 6, wherein the fiber-reinforced rubber is a rubberized cloth that is made by laminating and integrating rubber sheets on both faces of a foundation cloth.

8. The jig for fixing the laminated materials of claim 5, wherein the second sheet-shaped member has a member for adding stiffness, the member for adding stiffness being made of a material that is flexible and harder than the resin material, and the member for adding stiffness being formed as a plate that is the same size as, or larger than, the laminated materials, and smaller than the housing space.

9. The jig for fixing the laminated materials claim 1, wherein a spacer is provided inside the housing space or a flow space to prevent the exhaust hole from being occluded when the housing space is exhausted, the spacer being configured to allow air to pass therethrough.

10. The jig for fixing the laminated materials of claim 1, wherein the sealing member is formed to be integral with the first sheet-shaped member.

11. The jig for fixing the laminated materials of claim 1, wherein the sealing member is made of heat-resistant rubber.

12. The jig for fixing the laminated materials of claim 1, wherein the sealing member is formed to have a certain thickness so as to have the sealing member avoid any load from the pressing device being applied.

13. The jig for fixing the laminated materials of claim 1, wherein the exhaust portion is a passage to connect the housing space to the exhaust hole, wherein a portion for smoothing a deformation is formed at an end of the exhaust portion that is not connected to the housing space, which the portion for smoothing the deformation has a width that is larger than a width of the exhaust portion and has a curved outer face, and which the portion for smoothing the deformation is smoothly connected to the exhaust portion, which has no corner, and wherein the exhaust hole is formed between the housing space and the portion for smoothing the deformation.

14. The jig for fixing the laminated materials of claim 1, wherein the exhaust portion is a passage to connect the housing space to the exhaust hole, said exhaust portion in the shape of a loop, and wherein the exhaust hole is formed in the passage in the shape of a loop.

15. The jig for fixing the laminated materials of claim 1, wherein the exhaust portion is a passage to connect the housing space to the exhaust hole, and wherein a cover for a flow path that covers at least a portion of the exhaust portion is provided between the second sheet-shaped member and the sealing member, so that the exhausting portion is prevented from being occluded by the second sheet-shaped member, the exhaust portion being a flow path to connect the housing space to the exhaust hole.

16. The jig for fixing the laminated materials of claim 1, wherein the second columnar member has an inclined portion that outwardly inclines, or a rounded portion that is formed at an outer end, in a contact portion that faces the first columnar member and contacts the second sheet-shaped member.

* * * * *